(12) United States Patent
Uzawa et al.

(10) Patent No.: US 6,414,799 B1
(45) Date of Patent: Jul. 2, 2002

(54) ZOOM LENS, AND IMAGE PICKUP DEVICE USING THE SAME

(75) Inventors: Tsutomu Uzawa, Hidaka; Masahiro Suzuki, Hachioji, both of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/522,038

(22) Filed: Mar. 9, 2000

(30) Foreign Application Priority Data

Mar. 9, 1999 (JP) ............................................ 11-061897
Jan. 26, 2000 (JP) ........................................ 2000-017311

(51) Int. Cl.$^7$ .............................................. G02B 15/14
(52) U.S. Cl. ...................................... 359/687; 359/683
(58) Field of Search ................................. 359/687, 683, 359/676, 684, 685

(56) References Cited

U.S. PATENT DOCUMENTS 5,315,438 A * 5/1994 Shibata ........................ 359/687
5,886,828 A * 3/1999 Kim ............................. 359/687
5,923,478 A * 7/1999 Hashimura .................. 359/686

OTHER PUBLICATIONS

Patent Abstracts of Japan, Zoom Lens, Feb. 8, 1988, re JP–A–63–29718.
Patent Abstracts of Japan, Zoom Lens, Mar. 6, 1998, re JP–A–10–062687.
Patent Abstracts of Japan, Zoom Lens of Rear Focus Type, Mar. 26, 1996, re JP–A–8–082743.
Patent Abstracts of Japan, Zoom Lens, Jan. 24, 1984, re JP–A–59–13212.
Patent Abstracts of Japan, Aspherical Zoom Lens and Video Camera Using the Same, Dec. 22, 1994, re JP–A–6–347697.

* cited by examiner

Primary Examiner—Jordan M. Schwartz
(74) Attorney, Agent, or Firm—Pillsbury Winthrop LLP

(57) ABSTRACT

The invention relates to a zoom lens system which has a higher wide angle a high zoom ratio with well-corrected aberrations, is fast, and has a large back focus. The zoom lens comprises, in order from its object side, a first lens group G1 having positive refracting power, a second lens group G2 having negative refracting power, a third lens group G3 having positive refracting power and a fourth lens group G4 having positive refracting power. For zooming from a wide-angle end to a telephoto end of the zoom lens system, the second lens group G2 moves toward an image side of the zoom lens system, the third lens group G3 moves toward the object side and the fourth lens group moves toward the object side. A lens located nearest to the image side in the third lens group G3 is a negative lens concave with respect to an image plane of the zoom lens system and a lens located nearest to the object side in the fourth lens group G4 is a negative lens concave with respect to an object.

23 Claims, 19 Drawing Sheets

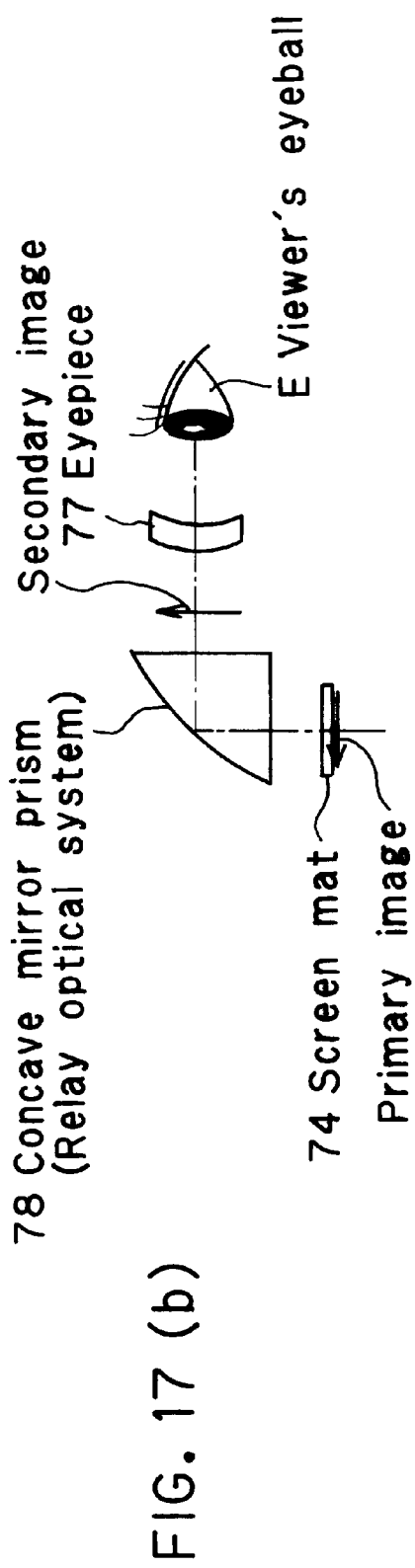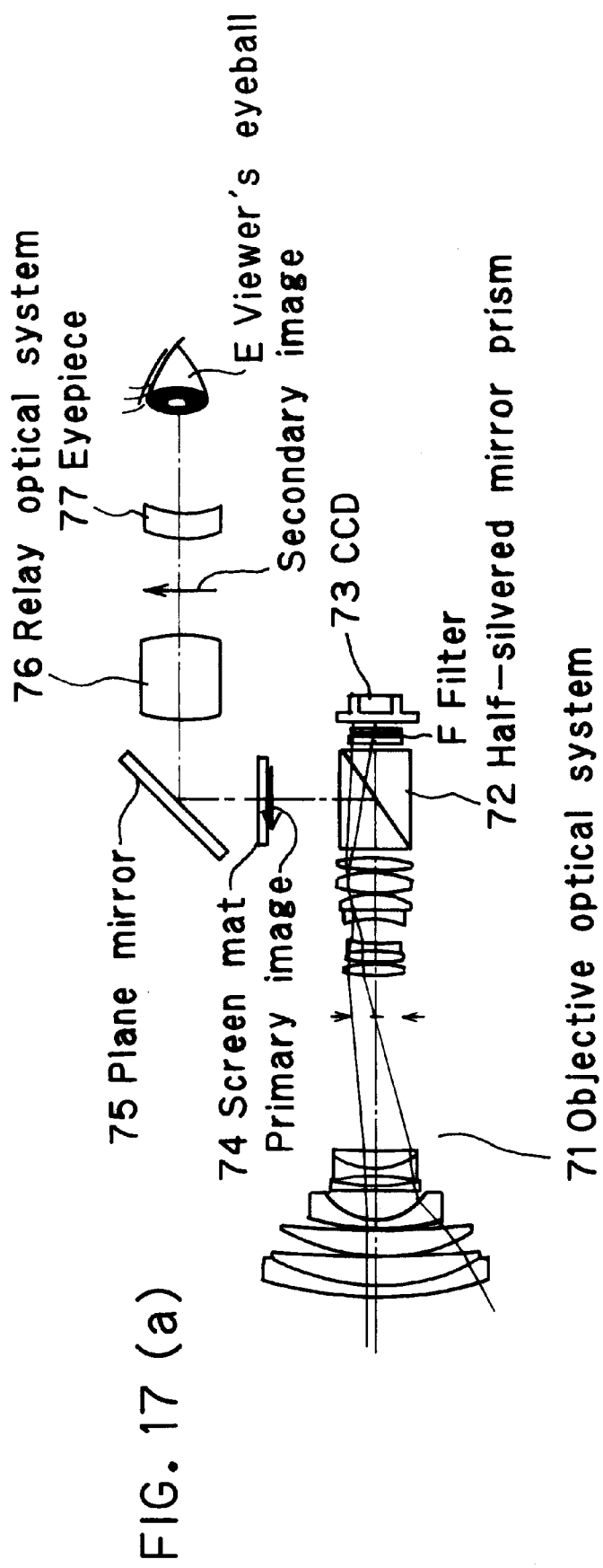
FIG. 17 (b)
FIG. 17 (a)

ZOOM LENS, AND IMAGE PICKUP DEVICE USING THE SAME

BACKGROUND OF THE INVENTION

The present invention relates generally to a zoom lens, and more particularly to a wide-angle zoom lens system suitable for use on video cameras, still video cameras and many others.

Recent zoom lenses currently in vogue for consumer-oriented video cameras are of the type which, as typically disclosed in JP-A 63-29718, comprise, in order from its object side, a positive, a negative, a positive and a positive lens group or four lens groups in all, with zooming occurring at the second lens group and correction of an image position upon zooming and focusing occurring at the fourth lens group. Many zoom lenses of this type have a field angle (2w) of about 50° at their wide-angle ends. On the other hand, JP-A 10-62687 discloses a zoom lens having a wider field angle, e.g., a field angle of about 66° at its wide-angle. This zoom lens comprises, in order from its object side, a positive, a negative, a positive and a positive lens group or four lens groups in all. While the second, third and fourth lens groups are all movable during zooming, a wide field angle is achievable by conforming to various conditions.

The zoom lenses set forth in JP-A 10-62687 all have a zoom ratio of about 3. Examples 1 and 2 are relatively fast as expressed by an F-number of 2 at their wide-angle ends. However, the back focus is small. Examples 3 to 6 have an F-number of about 2.8 at their wide-angle ends, but their back focuses are large.

There are strong demands for zoom lens systems that are ever higher in zoom ratios than those set forth in JP-A 10-62687. With pixel pitch reductions in electronic image pickup devices such as CCDs, a faster zoom lens system with well-corrected aberrations is increasingly demanded. In addition, it is desired to achieve a back focus large-enough for accommodation of an optical path splitter and a color separation prism for single-lens reflex cameras.

SUMMARY OF THE INVENTION

In view of such situations in the prior art as mentioned above, an object of the present invention is to provide a zoom lens system that has a wider field angle and a higher zoom ratio with well-corrected aberrations, is fast, and has a large back focus.

According to one aspect of the invention, this object is achieved by the provision of a zoom lens system which comprises, in order from an object side of said zoom lens system, a first lens group having positive refracting power, a second lens group having negative refracting power, a third lens group having positive refracting power and a fourth lens group having positive refracting power and in which for zooming from a wide-angle end to a telephoto end of said zoom lens system, said second lens group moves toward an image side of said zoom lens system, said third lens group moves toward said object side and said fourth lens group moves toward said object side, wherein:

a lens located nearest to said image side in said third lens group is a negative lens concave with respect to an image plane of said zoom lens system and a lens located nearest to said object side in said fourth lens group is a negative lens concave with respect to an object.

According to another aspect of the invention, there is provided a zoom lens system which comprises, in order from an object side of said zoom lens system, a first lens group having positive refracting power, a second lens group having negative refracting power, a third lens group having positive refracting power and a fourth lens group having positive refracting power and in which for zooming from a wide-angle end to a telephoto end of said zoom lens system, said first lens group remains fixed on an optical axis of said zoom lens system, said second lens group moves toward an image side of said zoom lens system, a stop remains fixed on said optical axis, said third lens group moves toward said object side and said fourth lens group moves toward said object side, wherein:

a lens located nearest to said image side in said third lens group is a negative lens concave with respect to an image plane of said zoom lens system and a lens located nearest to said object side in said fourth lens group is a negative lens concave with respect to an object.

Preferably in these cases, the fourth lens group should comprise, in order from its object side, a negative lens, a positive lens and a positive lens.

Why the aforesaid arrangements are used and how they work will now be explained.

The zoom lens system of the type which comprises, in order from its object side, a first lens group having positive refracting power, a second lens group having negative refracting power, a third lens group having positive refracting power and a fourth lens group having positive refracting power and in which for zooming from a wide-angle end to a telephoto end thereof, the second lens group moves toward an image side thereof, the third lens group moves toward the object side and the fourth lens group moves toward the object side is advantageous for achieving wider field angles, as explained with reference to JP-A 10-62687.

For the achievement of the object of the invention, the constructions of the third and fourth lens groups are of most important. To have a large back focus, the lens system must have a lens arrangement that enables the back focus to be easily ensured. However, the lens system also must be suitable for correction of axial aberrations, because with a large back focus yet a small F-number, the position of an axial light ray through the third and fourth lens groups becomes higher. To achieve high zoom ratios, the third and fourth lens groups in the lens system must move on the optical axis while aberration variations are reduced. To satisfy these conditions, the lens located nearest to the image side in the third lens group should be a negative lens concave with respect to the image plane and the lens located nearest to the object side in the fourth lens group should be a negative lens concave with respect to the object. The third and fourth lens groups, on the whole, comprise an arrangement approximate to a double-Gauss lens arrangement, and move for zooming while the separation between them is varied. It is thus possible to achieve the object of the invention.

In the second embodiment of the invention, where the stop is located is important to make a tradeoff between wide field angles and simplified lens barrel construction. For the downsizing of the first and fourth lens groups while wider field angles are achieved, it is favorable to locate the stop substantially at the center of the optical system. It is also favorable to fix the stop on the optical axis, because the construction of the lens barrel is not complicated. In view of the construction of the lens barrel, it is preferable to fix the first lens group in place during zooming.

In the first and second embodiments of the invention, the constructions of the third and fourth lens groups having zooming and image-forming actions are important to ensure the desired back focus and make correction for aberrations. This is particularly true of the construction of the fourth lens group. Since it is desired that the positive refracting power of the fourth lens group be shared by as many lens elements as possible, it is preferable that the fourth lens group comprises, in order from its object side, a negative lens, a positive lens and a positive lens.

According to the fourth embodiment of the invention where it is desired to reduce the number of lenses, the fourth lens group should preferably consist of, in order from the object side, a negative lens, a positive lens and a positive lens.

According to the fifth embodiment of the invention, the construction of the second lens group having zooming action is important to achieve higher zoom ratios. To make correction for aberrations due to zooming, it is desired that the negative refracting power of the second lens group be shared by as many lens elements as possible. In other words, it is preferable that the second lens group comprises, in order from the object side, a negative lens, a negative lens, a negative lens and a positive lens or a negative lens, a negative lens, a positive lens and a negative lens.

According to the sixth embodiment of the invention, it is desired that the positive refracting power of the fourth lens group be shared by as many lens elements as possible. In other words, it is preferable that the fourth lens group comprises, in order from the object side, a negative lens, a positive lens, a positive lens and a positive lens.

According to the seventh embodiment of the invention, any one of conditions (1) to (4) with respect to the third and fourth lens groups should be satisfied. Preferably any two, and more preferably any three should be satisfied. Most preferably, all such conditions should be satisfied.

$$-0.9<(r_{4F}+r_{3R})/(r_{4F}-r_{3R})<0.9 \quad (1)$$

$$0.5<(1/r_{3R}-1/r_{4F})\times f_w<2.5 \quad (2)$$

$$-3.7<f_{4F}/f_w<-1 \quad (3)$$

$$v_{d4F}<40 \quad (4)$$

where:
$r_{3R}$ is the radius of curvature of the image-side surface of the negative lens located nearest to the image side in the third lens group,
$r_{4F}$ is the radius of curvature of the object-side surface of the negative lens located nearest to the object side in the fourth lens group,
$f_w$ is the focal length of the zoom lens system at its wide-angle end,
$f_{4F}$ is the focal length of the negative lens located nearest to the object side in the fourth lens group, and
$v_{d4F}$ is the Abbe's number of the negative lens located nearest to the object side in the fourth lens group.

Condition (1) defines how aberrations are shared or corrected at the third and fourth lens groups. Any deviation from the upper and lower limits of 0.9 and −0.9 in condition (1) results in large aberration variations due to zooming.

Relating to correction of aberrations throughout the third and fourth lens groups, condition (2) is provided to make full correction for aberrations throughout the third and fourth lens groups. When the lower limit of 0.5 in condition (2) is not reached, aberrations remain under-corrected throughout the third and fourth lens groups, and when the upper limit of 2.5 is exceeded, aberrations remain over-corrected throughout the third and fourth lens groups.

Condition (3) is provided to ensure the desired back focus. When the lower limit of −3.7 in condition (3) is not reached, it is difficult to ensure the back focus. Exceeding the upper limit of −1 is favorable to ensure the back focus, but causes the overall length of the lens arrangement to increase excessively.

Condition (4) relates to correction of chromatic aberrations. Any deviation from the range defined by condition (4) causes the chromatic aberrations to be under-corrected.

According to the eighth embodiment of the invention, any one of the following conditions should preferably be satisfied with respect to zooming by the third and fourth lens groups. More preferably any two should be satisfied, and most preferably all such conditions should be satisfied.

$$0.6<z_3/f_w<3 \quad (5)$$

$$0.3<z_4/f_w<2.5 \quad (6)$$

$$0.6<D_{s3w}<3 \quad (7)$$

where:
$z_i$ (i is 3 or 4) is the amount of movement of the i-th lens group from the wide-angle end to the telephoto end with the plus sign indicating the movement of the i-th lens group from the image side to the object side, and
$D_{s3W}$ is the separation between the stop and the third lens group at the wide-angle end.

Defining the amounts of movement of the third and fourth lens groups, respectively, conditions (5) and (6) are provided to allow the third and fourth lens groups to have sufficient zooming action. Condition (7) defines the position of the third lens group at the wide-angle end to reduce the lens diameter.

Any deviation from the respective lower limits of 0.6 and 0.3 in conditions (5) and (6) is unfavorable for the achievement of high zoom ratios, because the zooming action of the third and fourth lens groups becomes weak. Otherwise, the amount of the second lens group to take part in zooming increases with the result that off-axis rays passing through the first lens group on the wide-angle side become high, and so the first lens group becomes large.

When the respective upper limits of 3 and 2.5 in conditions (5) and (6) are exceeded, off-axis rays passing through the third and fourth lens groups becomes high, resulting in an increase in the diameter of the third and fourth lens groups.

When the lower limit of 0.6 in condition (7) is not reached, off-axis rays passing through the first lens group on the wide-angle side become high, resulting in an increase in the diameter of the first lens group. When the upper limit of 3 in condition (7) is exceeded, off-axis rays through the third and fourth lens groups become high, again resulting in an increase in the diameter of the third and fourth lens groups.

According to the ninth embodiment of the invention, the zoom lens system comprises, in order from its object side, a first lens group having positive refracting power, a second lens group having negative refracting power, a third lens group having positive refracting power and a fourth lens group having positive refracting power. Preferably in this embodiment, any one negative lens in the second lens group should satisfy the following condition (8):

$$0.59<(n_g-n_F)/(n_F-n_C) \quad (8)$$

where:
$n_j$ (j is g, F, and C) is the j-line refractive index of the negative lens.

According to the tenth embodiment of the invention, it is desired that any one negative lens in the second lens group in each of the zoom lens systems according to the first to fourth embodiments of the invention should satisfy condition (8).

In the ninth and tenth embodiments of the invention, condition (8) relates to correction of chromatic aberration of magnification. In the case of a zoom lens system of the +−++ type such as those set forth in JP-A's 63-29718 and 10-62687, the chromatic aberration of magnification is likely to occur because off-axis rays passing through the second lens group at the wide-angle end become high. When the chromatic aberration of magnification produced at the second lens group is corrected between the F-line and the C-line, the aberration is susceptible to over-correction at the g-line. This tendency increases with increasing zoom ratios.

To reduce the over-correction of the aberration at the g-line, it is here effective to use a vitreous material having a high partial dispersion ratio wherein the g-line refractive index is higher than the F- and C-line refractive indices. The use of such a vitreous material is favorable to reduce the over-correction of the aberration at the g-line. Since the second lens group has negative refracting power on the whole, it is preferable to use the vitreous material for the negative lens in the second lens group. Any deviation from the range defined by condition (8) is unfavorable for the chromatic aberration of magnification on the wide-angle side.

According to the eleventh embodiment of the invention, it is desired that any one positive lens in the third and fourth lens groups in each of the first to fourth zoom lens systems of the invention should satisfy condition (9).

According to the twelfth embodiment of the invention, it is desired that any one positive lens in the third lens group in each of the first to fourth zoom lens systems of the invention should satisfy condition (9).

In the ninth to eleventh embodiments of the invention, condition (8) relates to correction of chromatic aberration of magnification. In the case of a zoom lens system of the +−++ type such as those set forth in JP-A's 63-29718 and 10-62687, the chromatic aberration of magnification is likely to occur because off-axis rays passing through the third and fourth lens groups via the overall zooming zone at the wide-angle end become high. When the chromatic aberration of magnification produced at the third and fourth lens groups is corrected between the F-line and the C-line, the aberration is susceptible to over-correction at the g-line. This tendency increases as the F-number becomes small (or the lens becomes fast) and the back focus increases. To reduce the over-correction of the aberration at the g-line, it is here effective to use a vitreous material having a high partial dispersion ratio wherein the g-line refractive index is higher than the F- and C-line refractive indices. The use of such a vitreous material is favorable to reduce the over-correction of the aberration at the g-line. Since the third and fourth lens groups have each negative refracting power on the whole, it is preferable to use the vitreous material for a positive lens or lenses in the third and fourth lens groups. Any deviation from the range defined by condition (8) is unfavorable for longitudinal chromatic aberration.

For instance, the vitreous materials having such partial dispersion ratios as represented by conditions (8) and (9) are set forth in "OHARA GLASS CATALOGUE", 1995, $\theta_{g,F}$-$v_d$ list. The Abbe's number and the partial dispersion ratio $\theta_{g,F}$ have such relations to each other as shown in that list. Comparison tables for various vitreous materials made by various makers (SCHOTT, HOYA) are given in The Comparison Table for Recommendable Vitreous Materials in "OHARA GLASS CATALOGUE", 1995.

According to the thirteenth embodiment of the invention, focusing in each of the zoom lens systems according to the first to fourth embodiments of the invention may be carried out with the fourth lens group. This is favorable for the downsizing of the overall lens arrangement. In addition to the fourth lens group, the second lens group, too, is suitable for focusing, because the second lens group in the zoom lens system of the invention has a relatively small absolute value for image-formation magnification. Since the second lens group is located nearer to the image side at the telephoto end than at the wide-angle end, a sufficient focusing space is ensured for the second lens group on the telephoto side, so that the fourth lens group can be combined with the second lens group for focusing, thereby phototaking an image at more nearby distances.

In the case of the zoom lens system of the invention, focusing should preferably be carried out with the fourth lens group or the second lens group, as mentioned just above. For focusing, however, it is acceptable to use other lens group or groups. It is also acceptable to move the whole lens arrangement or move an image pickup device.

According to the fourteenth embodiment of the invention, it is favorable for aberration correction and constructional simplifications to use an aspherical surface in each lens group in the zoom lens system according to the first, second, third or fourth embodiment of the invention. In particular, it is effective to use aspherical surfaces in the third and fourth lens groups, each having image-forming action.

According to the fifteenth embodiment of the invention, each of the zoom lens systems according to the first to fourth embodiments of the invention may be designed as a single-lens reflex finder optical system by locating an optical path splitter for an optical finder between the fourth lens group and the image side. If a member having a constantly fixed, translucent reflecting surface is used as the optical path splitter, it is then possible to simplify the mechanical construction of the optical system. The member having a translucent reflecting surface, for instance, includes a prism having a translucent reflecting surface and a thin mirror having a translucent reflecting surface. The use of a movable member such as a quick-return mirror as the optical path splitter is favorable for the overall sensitivity of the camera because there is no quantity-of-light loss during phototaking.

According to the sixteenth embodiment of the invention, an aspherical surface is used for at least one surface in the fourth lens group. Preferably in this case, the aspherical surface should be configured such that its refracting power decreases or its negative refracting power increases farther off the optical axis.

According to the seventeenth embodiment of the invention, the zoom lens system comprises, in order from its object side, a first lens group having positive refracting power, a second lens group having negative refracting power, a third lens group having positive refracting power and a fourth lens group having positive refracting power, wherein any one positive lens in the third or fourth lens group satisfies the following condition (9):

$$0.59 < (n_g - n_F)/(n_F - n_C) \tag{9}$$

where:

$n_j$ (j is g, F, and C) is the j-line refractive index of the positive lens.

Furthermore in the zoom lens system of the invention, an additional lens group may be located between the fourth lens group and the image side for the purposes of control of the exit pupil position, correction of aberrations, size reductions, etc. It is also acceptable to use a plastic lens in any lens group for the purposes of cost reductions, etc.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 17(a) and 17(b) are conceptual views showing one construction of a single-lens reflex camera in which the zoom lens system of the invention is incorporated.

FIGS. 21(a), 21(b) and 22(c) are a front, a side and a sectional view of a portable telephone handset, respectively, in which the zoom lens system of the invention is incorporated in the form of an objective optical system.

DESCRIPTION OF THE PREFERRED EMBODIMENTS

The zoom lens system of the invention will now be explained with reference to Examples 1 to 10.

Lens sections of Examples 1 to 10 at their wide-angle ends (a), intermediate settings (b) and telephoto ends (c) are shown in FIGS. 1 to 10. Numerical data on each example will be enumerated later.

EXAMPLE 1

Figure 1A:
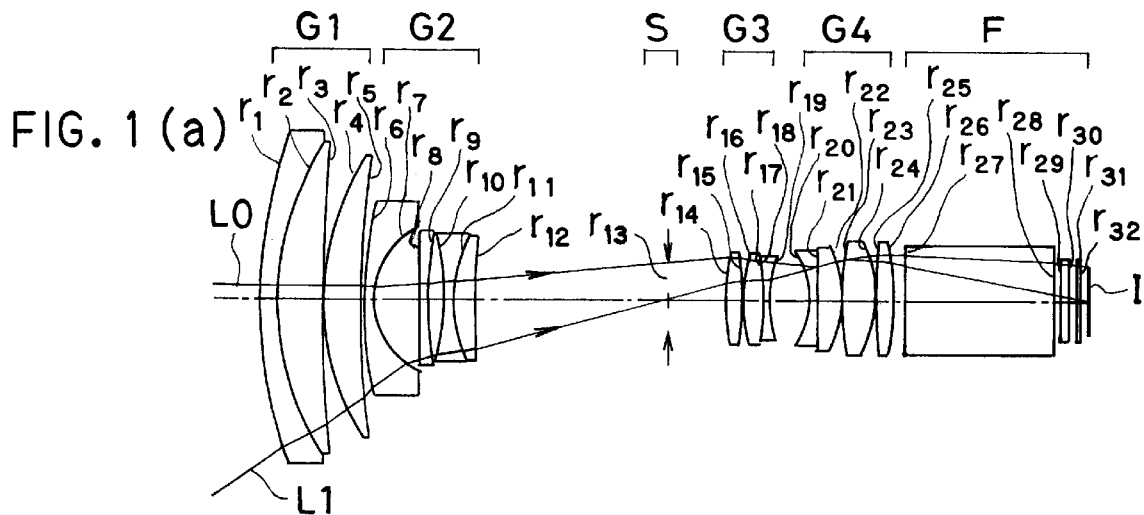
FIGS. 1(a), 1(b) and 1(c) are sectional views of Example 1 of the zoom lens system according to the invention.
Figure 1B:
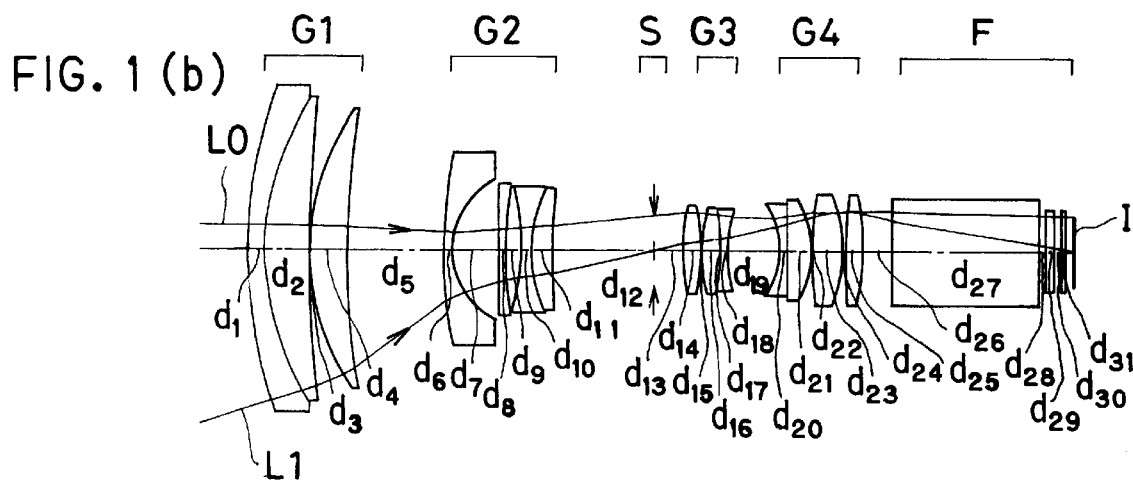
Figure 1C:
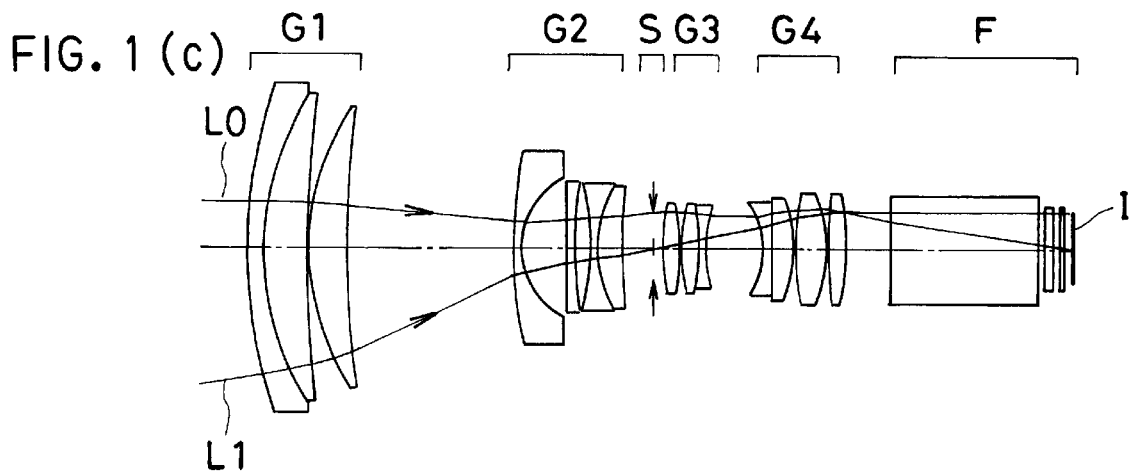

This example is directed to a zoom lens system which, as shown in FIG. 1, a first lens group G1, a second lens group G2, a third lens group G3 and a fourth lens group G4, with a fixed stop S is located between the second lens group G2 and the third lens group G3. The first lens group G1 is a fixed lens group and, for zooming from the wide-angle end to the telephoto end of the system, the second lens group G2 moves toward an image plane I while the third and fourth lens groups G3 and G4 move toward the object side. An optical path splitter, an optical filter, etc. are located between the fourth lens group G4 and the image plane I. This is also true of the following examples. The first lens group G1 consists of a doublet composed of a negative meniscus lens convex on the object side and a positive meniscus lens convex on the object side, and a positive meniscus lens convex on the object side, three in all. The second lens group G2 consists of two negative meniscus lenses, each convex on the object side, and a doublet composed of a double-concave lens and a positive meniscus lens convex on the object side, four in all. The third lens group G3 consists of two double-convex lenses and a double-concave lens, three in all. The fourth lens group G4 consists of a doublet composed of a negative meniscus lens convex on the image side and a positive meniscus lens convex on the image side, and two double-convex lenses, four in all. Two aspherical surfaces are used, one for the object-side surface of the second double-convex lens in the third lens group G3 and another for the surface located nearest to the image side in the fourth lens group G4.

EXAMPLE 2

Figure 2:
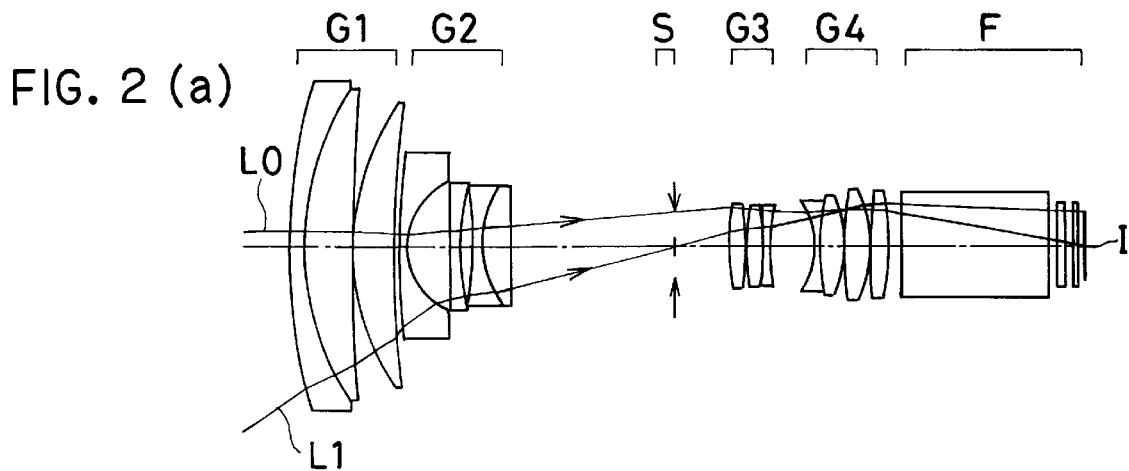
FIGS. 2(a), 2(b) and 2(c) are sectional views of Example 2 of the zoom lens system according to the invention.
Figure 2:
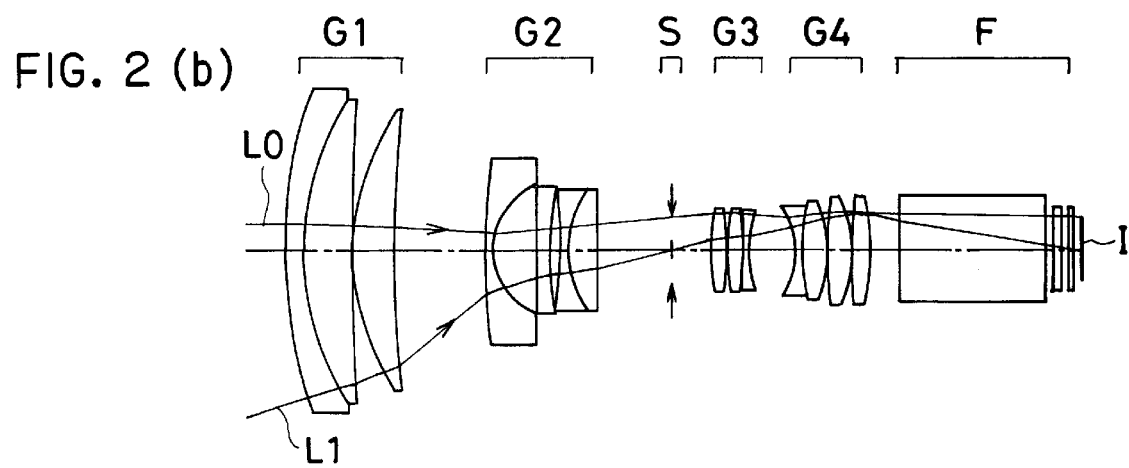
Figure 2:
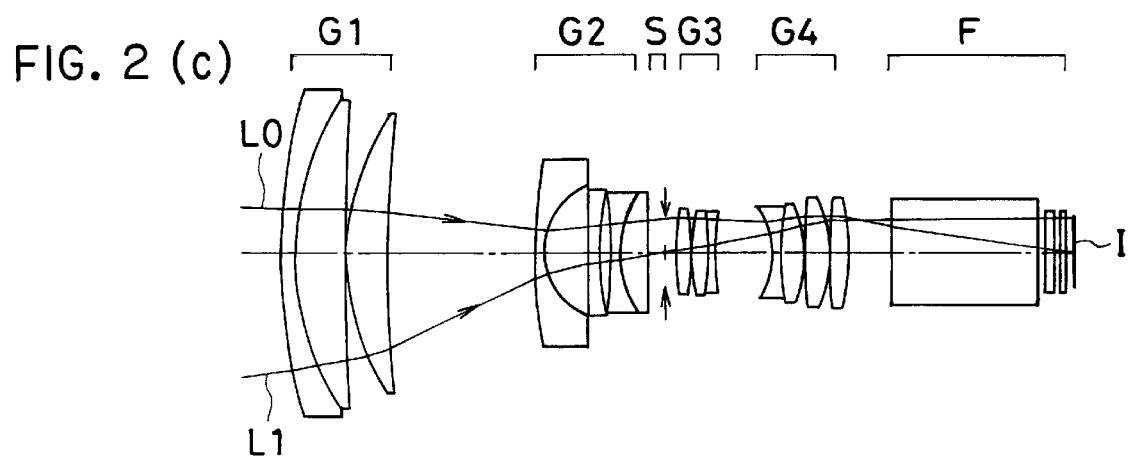

As shown in FIG. 2, the first lens group G1 consists of a doublet composed of a negative meniscus lens convex on the object side and a positive meniscus lens convex on the object side, and a positive meniscus lens convex on the object side, three in all. The second lens group G2 consists of two negative meniscus lenses, each convex on the object side, and a doublet composed of a double-concave lens and a positive meniscus lens convex on the object side, four in all. The third lens group G3 consists of two double-convex lenses and a double-concave lens, three in all. The fourth lens group G4 consists of a doublet composed of a double-concave lend and a double-convex lens and two double-convex lenses, four in all. Two aspherical surfaces are used, one for the object-side surface of the second double-convex lens in the third lens group G3 and another for the surface located nearest to the image side in the fourth lens group G4.

EXAMPLE 3

Figure 3:
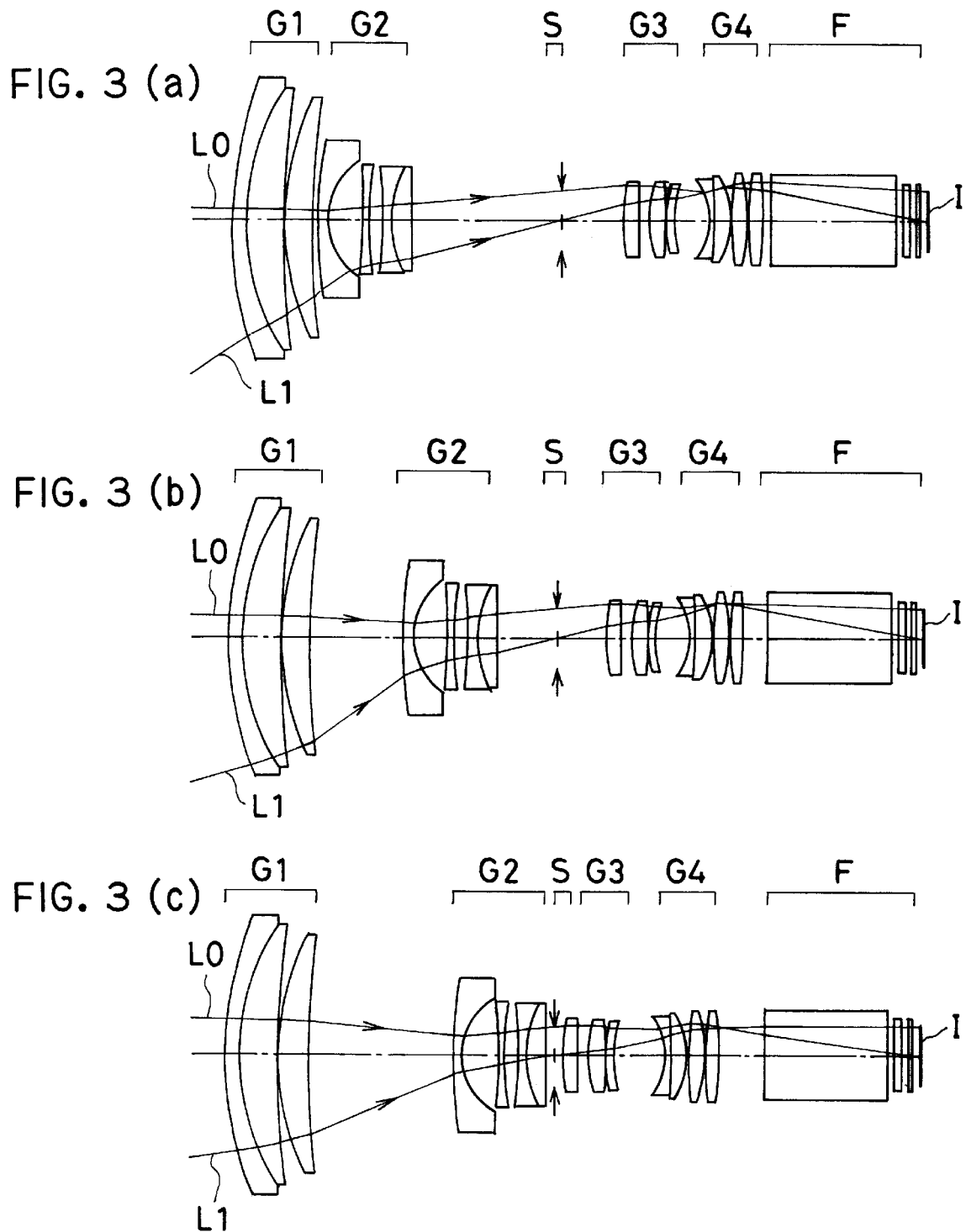
FIGS. 3(a), 3(b) and 3(c) are sectional views of Example 3 of the zoom lens system according to the invention.

As shown in FIG. 3, the first lens group G1 consists of a doublet composed of a negative meniscus lens convex on the object side and a positive meniscus lens convex on the object side, and a positive meniscus lens convex on the object side, three in all. The second lens group G2 consists of a negative meniscus lens convex on the object side, a double-concave lens and a doublet composed of a double-concave lens and a positive meniscus lens convex on the object side, four in all. The third lens group G3 consists of a positive meniscus lens convex on the object side, a double-convex lens and a negative meniscus lens convex on the object side, three in all. The fourth lens group G4 consists of a doublet composed of a negative meniscus lens convex on the image side and a positive meniscus lens convex on the image side, and four double-convex lenses, four in all. Two aspherical surfaces are used, one for the object-side surface of the double-convex lens in the third lens group G3 and another for the surface located nearest to the image side in the fourth lens group G4.

EXAMPLE 4

Figure 4:
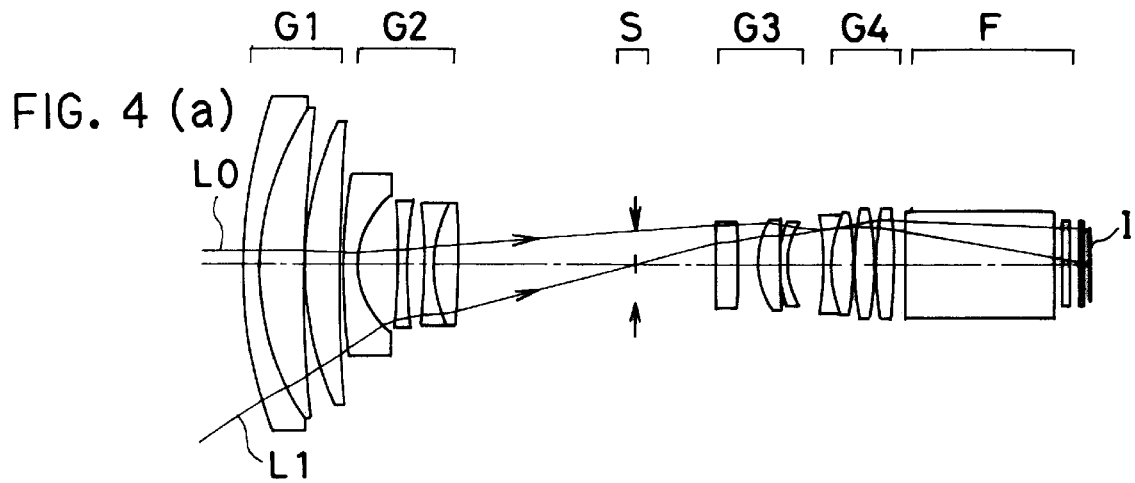
FIGS. 4(a), 4(b) and 4(c) are sectional views of Example 4 of the zoom lens system according to the invention.
Figure 4:
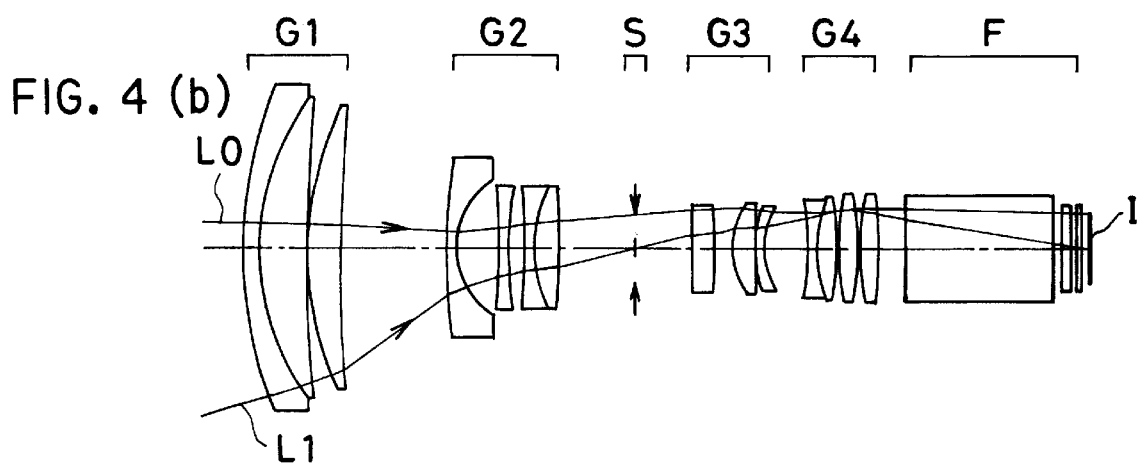
Figure 4:
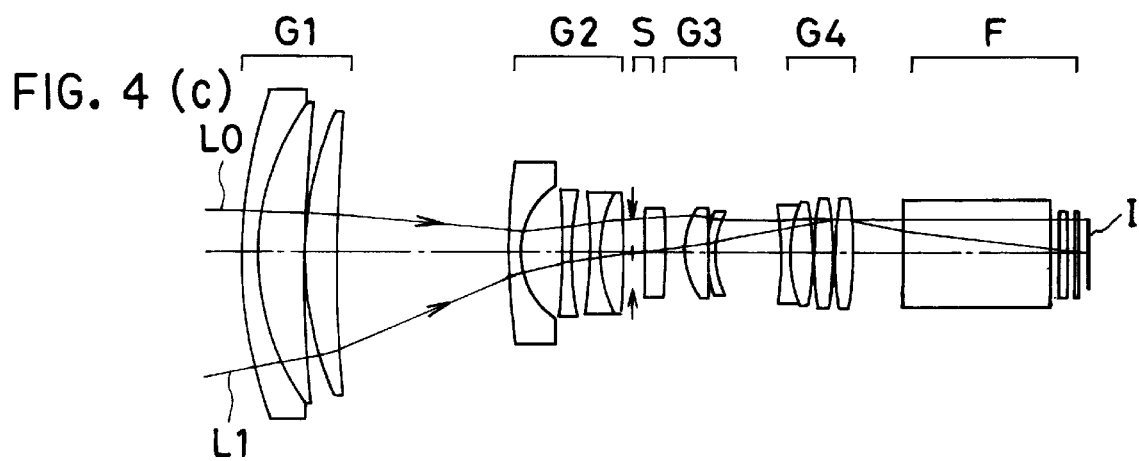

As shown in FIG. 4, the first lens group G1 consists of a doublet composed of a negative meniscus lens convex on the object side and a positive meniscus lens convex on the object side, and a positive meniscus lens convex on the object side, three in all. The second lens group G2 consists of a negative meniscus lens convex on the object side, a double-concave lens and a doublet composed of a double-concave lens and a double-convex lens, four in all. The third lens group G3 consists of a double-convex lens, a positive meniscus lens convex on the object side and a negative meniscus lens convex on the object side, three in all. The fourth lens group G4 consists of a doublet composed of a double-concave lens and a double-convex lens and two double-convex lenses, four in all. Two aspherical surfaces are used, one for the object-side surface of the positive meniscus lens convex on the object side in the third lens group G3 and another for the surface located nearest to the image side in the fourth lens group G4.

EXAMPLE 5

Figure 5:
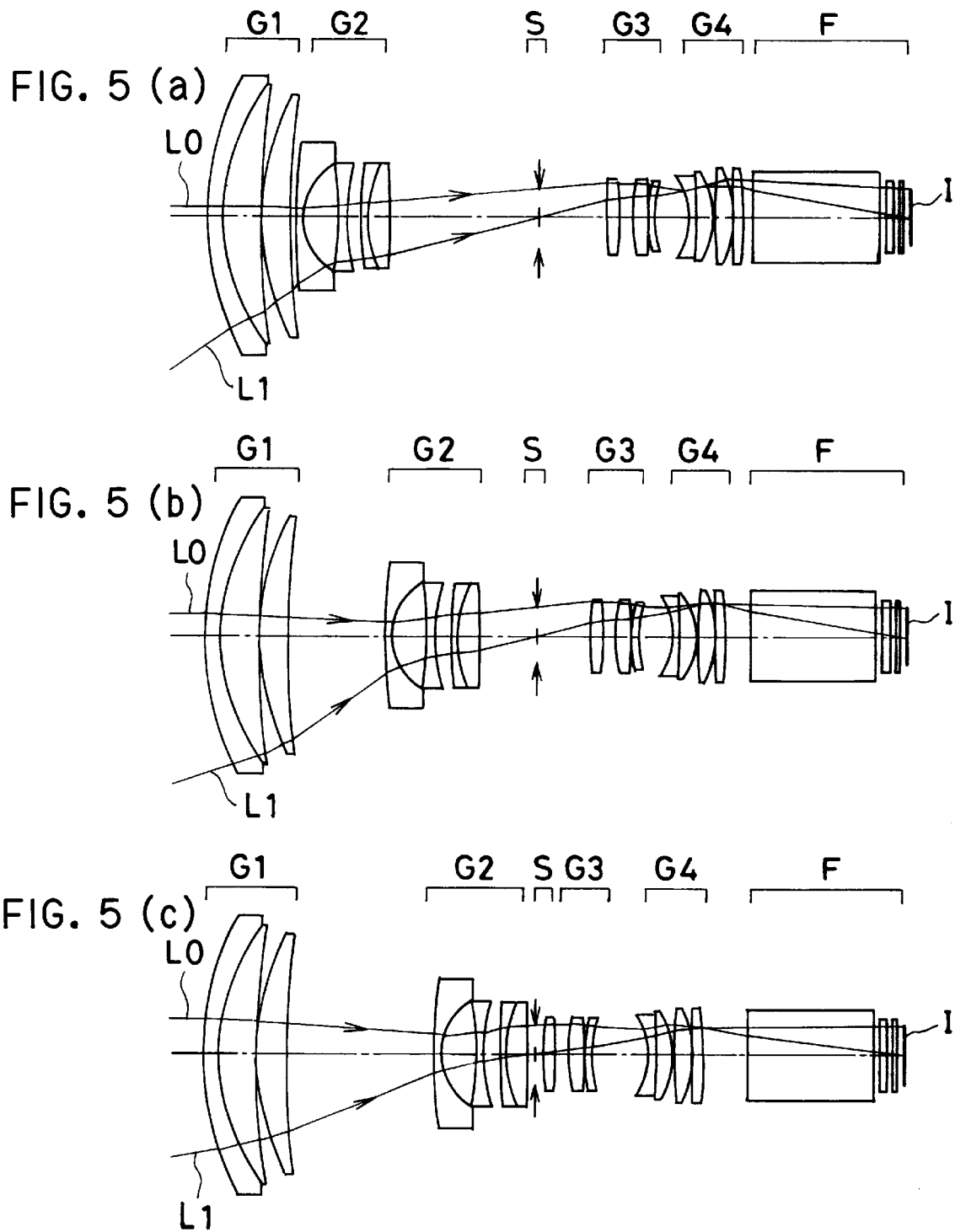
FIGS. 5(a), 5(b) and 5(c) are sectional views of Example 5 of the zoom lens system according to the invention.

As shown in FIG. 5, the first lens group G1 consists of a doublet composed of a negative meniscus lens convex on the object side and a positive meniscus lens convex on the object side, and a positive meniscus lens convex on the object side, three in all. The second lens group G2 consists of a negative meniscus lens convex on the object side, a double-concave lens and a doublet composed of a negative meniscus lens convex on the object side and a plano-convex lens, four in all. The third lens group G3 consists of two double-convex lenses and a negative meniscus lens convex on the image side, three in all. The fourth lens group G4 consists of a doublet composed of a negative meniscus lens convex on the image side and a positive meniscus lens convex on the image side, a double-convex lens and a positive meniscus lens convex on the image side, four in all. Three aspherical surfaces are used, one for the image-side surface of the double-concave lens in the second lens group G2, one for the surface located nearest to the object side in the third lens group G3, and one for the object-side surface of the positive meniscus lens located nearest to the image side in the fourth lens group G4.

EXAMPLE 6

Figure 6:
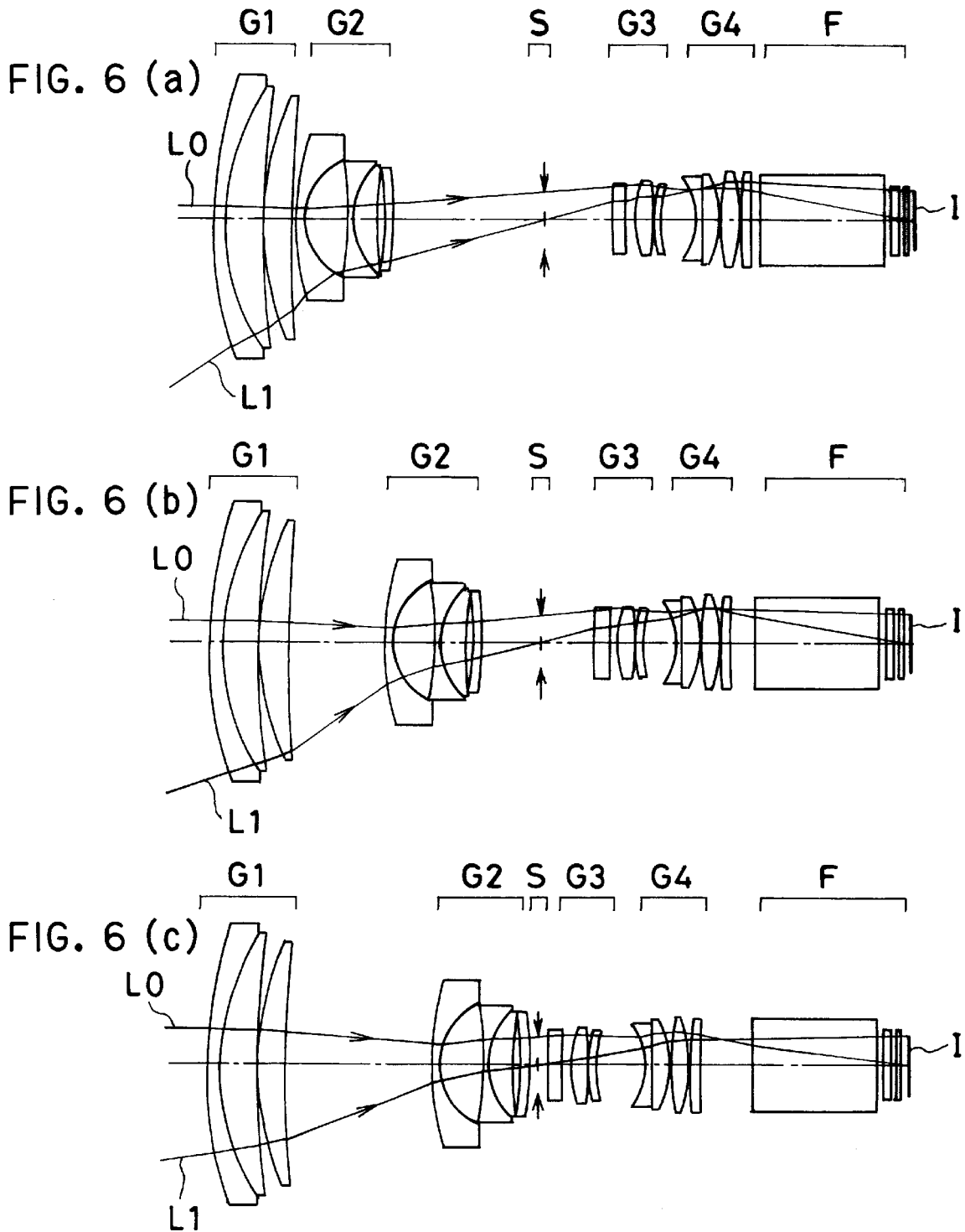
FIGS. 6(a), 6(b) and 6(c) are sectional views of Example 6 of the zoom lens system according to the invention.

As shown in FIG. 6, the first lens group G1 consists of a doublet composed of a positive meniscus lens convex on the object side and a positive meniscus lens convex on the object side, and a positive meniscus lens convex on the object side, three in all. The second lens group G2 consists of a negative meniscus lens convex on the object side, a doublet composed of a double-concave lens and a negative meniscus lens convex on the object side and a negative meniscus lens convex on the image side, four in all. The third lens group G3 consists of a positive meniscus lens convex on the object side, a double-convex lens and a negative meniscus lens convex on the object side, three in all. The fourth lens group G4 consists of a doublet composed of a negative meniscus lens convex on the image side and a positive meniscus lens convex on the image side, a double-convex lens and a positive meniscus lens convex on the object side. Two aspherical surfaces are used, one for the object-side surface of the double-convex lens in the third lens group G3 and another for the object-side surface of the positive meniscus lens convex on the object side in the fourth lens group G4.

EXAMPLE 7

Figure 7:
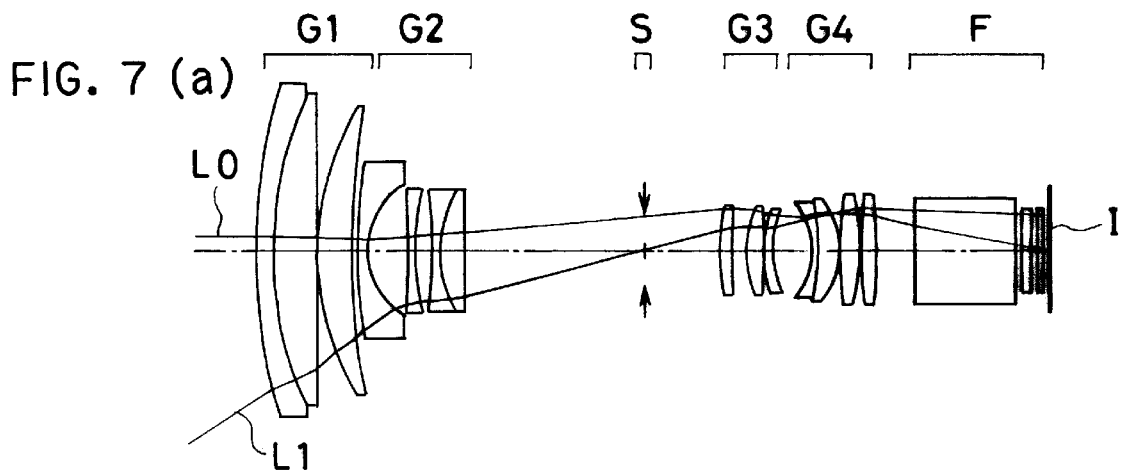
FIGS. 7(a), 7(b) and 7(c) are sectional views of Example 7 of the zoom lens system according to the invention.
Figure 7:
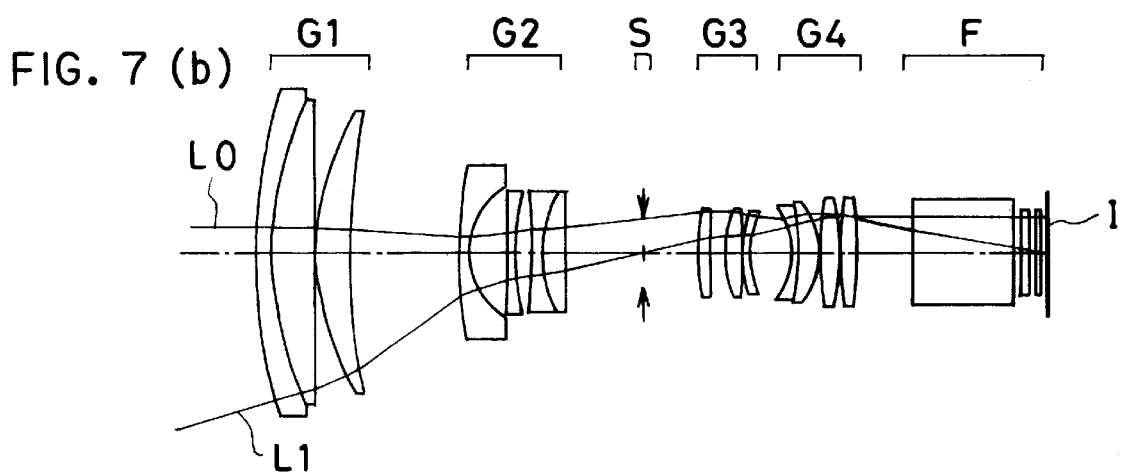
Figure 7:
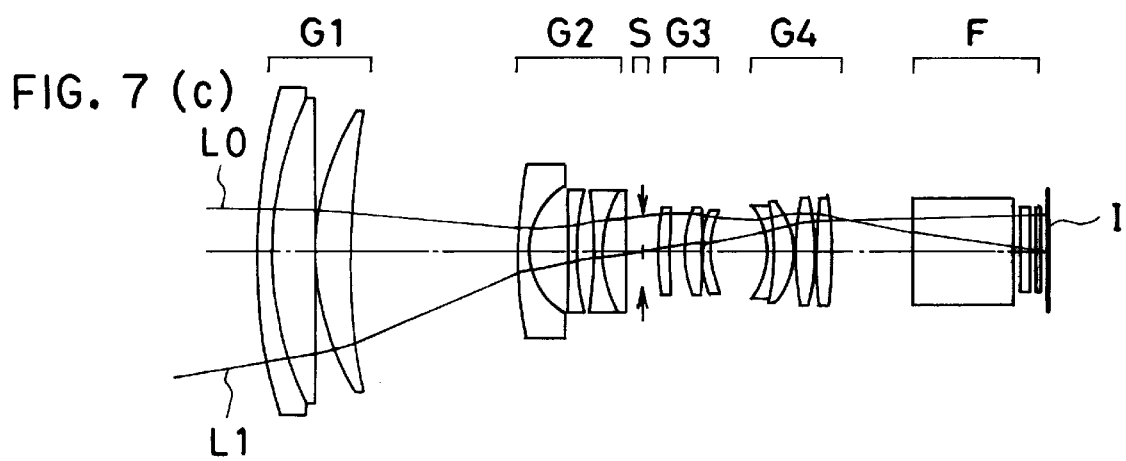

As shown in FIG. 7, the first lens group G1 consists of a doublet composed of a negative meniscus lens convex on the object side and a positive meniscus lens convex on the object side, and a positive meniscus lens convex on the object side, three in all. The second lens group G2 consists of a negative meniscus lens convex on the object side, a double-concave lens and a doublet composed of a double-concave lens and a double-convex lens, four in all. The third lens group G3 consists of a positive meniscus lens convex on the object side, a double-convex lens and a negative meniscus lens convex on the object side, three in all. The fourth lens group G4 consists of a doublet composed of a negative meniscus lens convex on the image side and a positive meniscus lens convex on the image side and two double-convex lenses, four in all. Two aspherical surfaces are used, one for the object-side surface of the double-convex lens in the third lens group G3 and another for the surface nearest to the image side in the fourth lens group G4.

EXAMPLE 8

Figure 8:
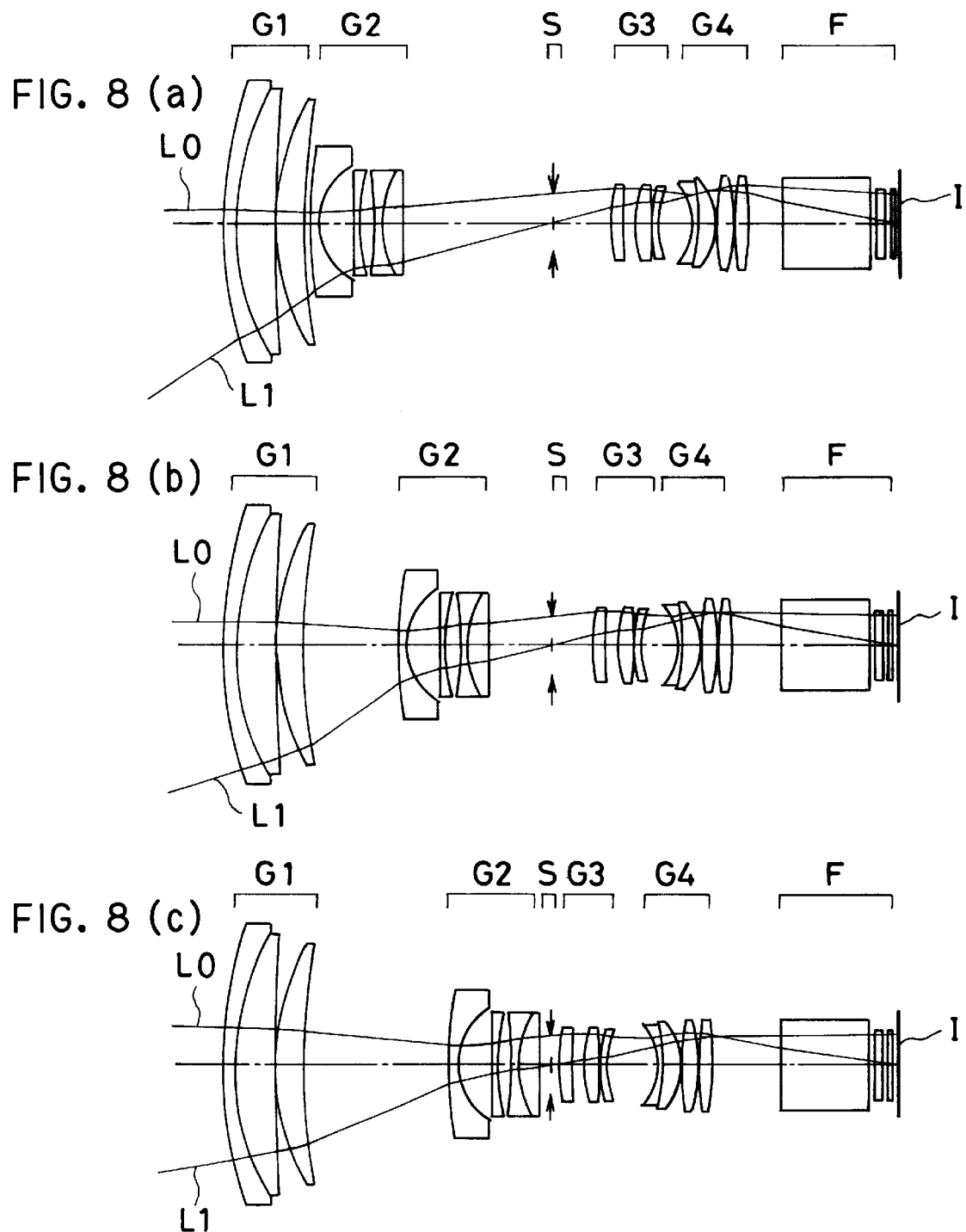
FIGS. 8(a), 8(b) and 8(c) are sectional views of Example 8 of the zoom lens system according to the invention.

As shown in FIG. 8, the first lens group G1 consists of doublet composed of a negative meniscus lens convex on the object side and a positive meniscus lens convex on the object side and a positive meniscus lens convex on the object side, three in all. The second lens group G2 consists of a negative meniscus lens convex on the object side, a plano-double-concave lens and a doublet composed of a double-concave lens and a plano-convex lens, four in all. The third lens group G3 consists of a positive meniscus lens convex on the object side, a double-convex lens and a negative meniscus lens convex on the object side, three in all. The fourth lens group G4 consists of a doublet composed of a negative meniscus lens convex on the image side and a positive meniscus lens convex on the image side, and two double-convex lenses, four in all. Two aspherical surfaces are used, one for the object-side surface of the double-convex lens in the third lens group G3 and another for the surface nearest to the image side in the fourth lens group G4.

EXAMPLE 9

Figure 9:
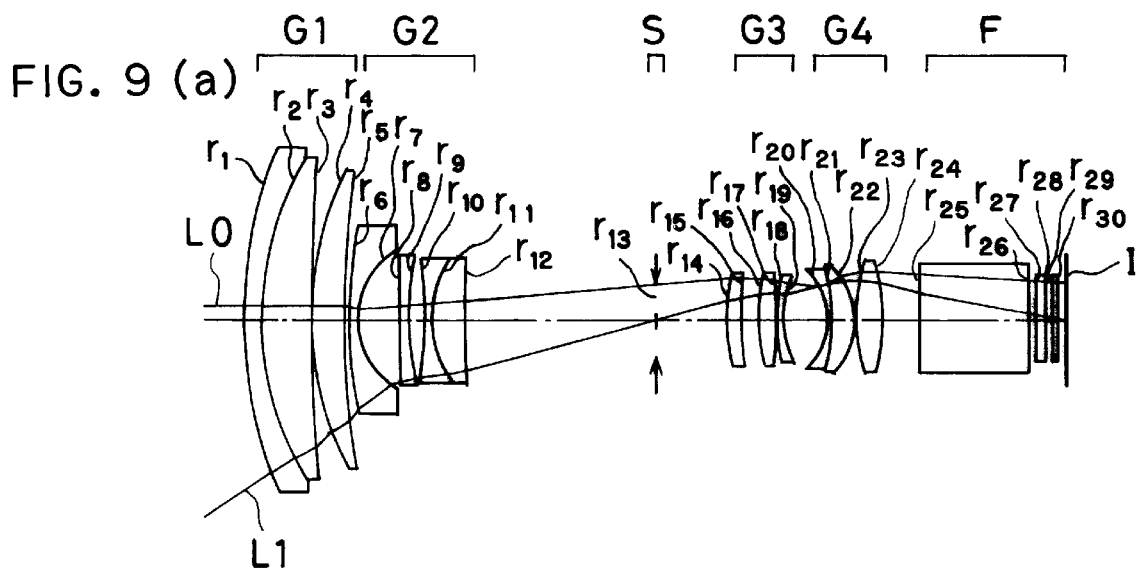
FIGS. 9(a), 9(b) and 9(c) are sectional views of Example 9 of the zoom lens system according to the invention.
Figure 9:
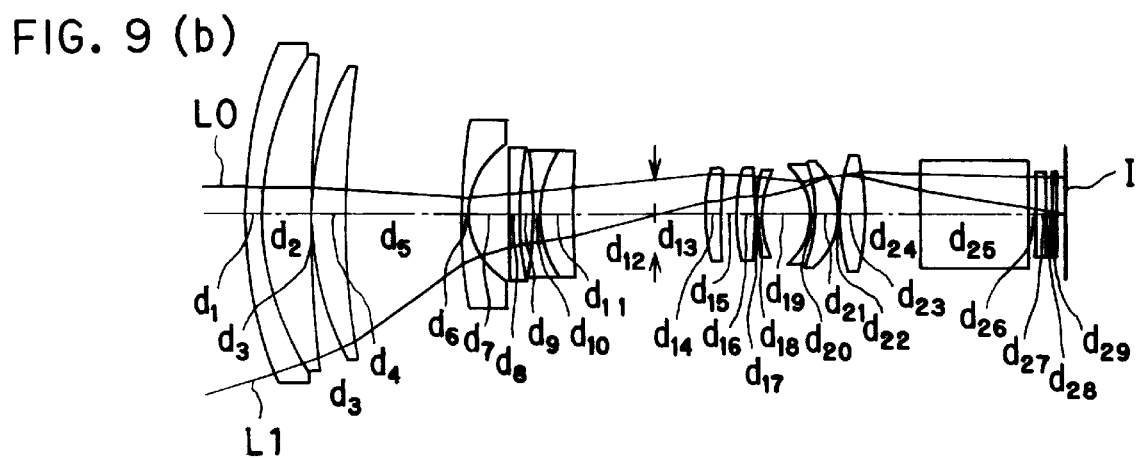
Figure 9:
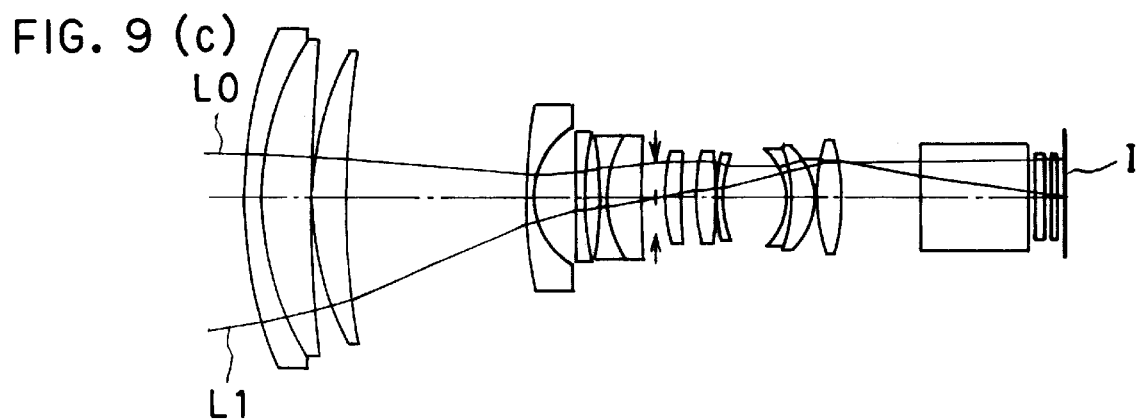

As shown in FIG. 9, the first lens group G1 consists of a doublet composed of a negative meniscus lens convex on the object side and a positive meniscus lens convex on the object side, and a positive meniscus lens convex on the object side, three in all. The second lens group G2 consists of two negative meniscus lenses, each convex on the object side, and a doublet composed of a double-concave lens and a positive meniscus lens convex on the object side, four in all. The third lens group G3 consists of a positive meniscus lens convex on the object side, a double-convex lens and a negative meniscus lens convex on the object side, three in all. The fourth lens group G4 consists of a doublet composed of a negative meniscus lens convex on the image side and a positive meniscus lens convex on the image side, and a double-convex lens, three in all. Two aspherical surfaces are used, one for the object-side surface of the double-convex lens in the third lens group G3 and another for the surface nearest to the image side in the fourth lens group G4.

EXAMPLE 10

Figure 10:
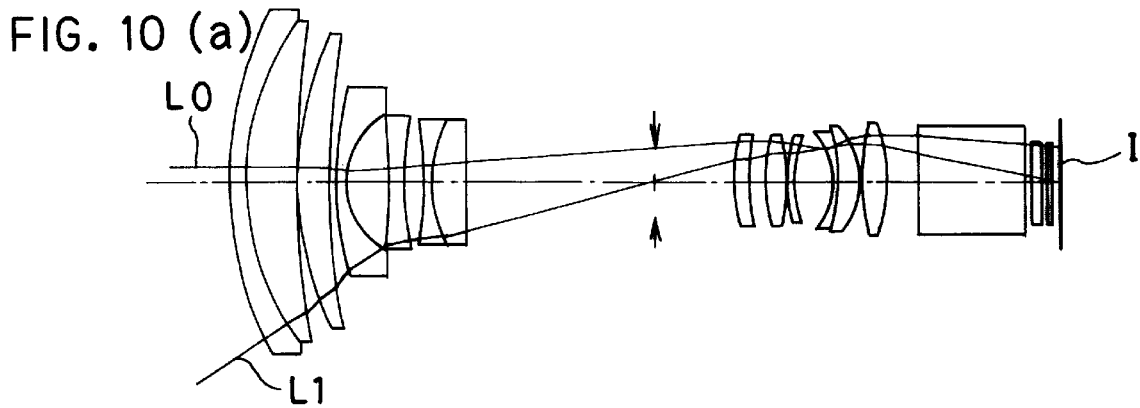
FIGS. 10(a), 10(b) and 10(c) are sectional views of Example 10 of the zoom lens system according to the invention.
Figure 10:
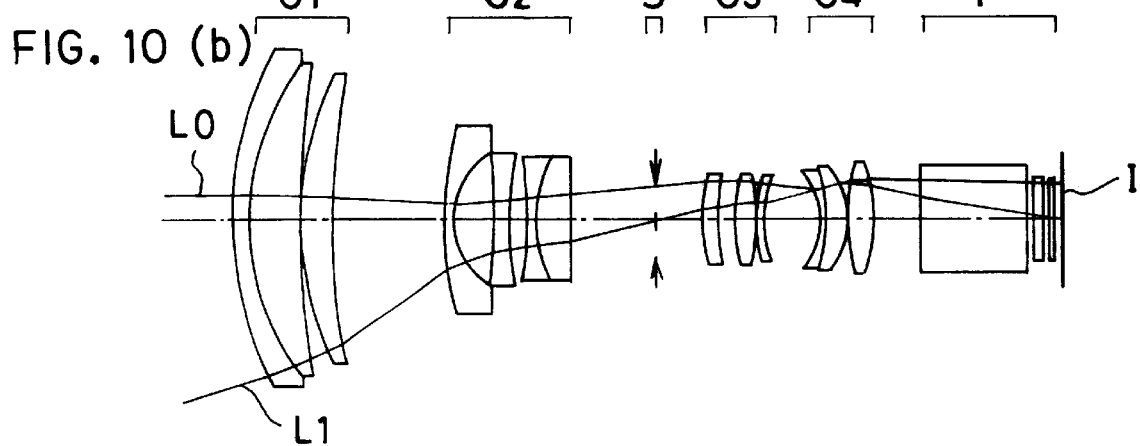
Figure 10:
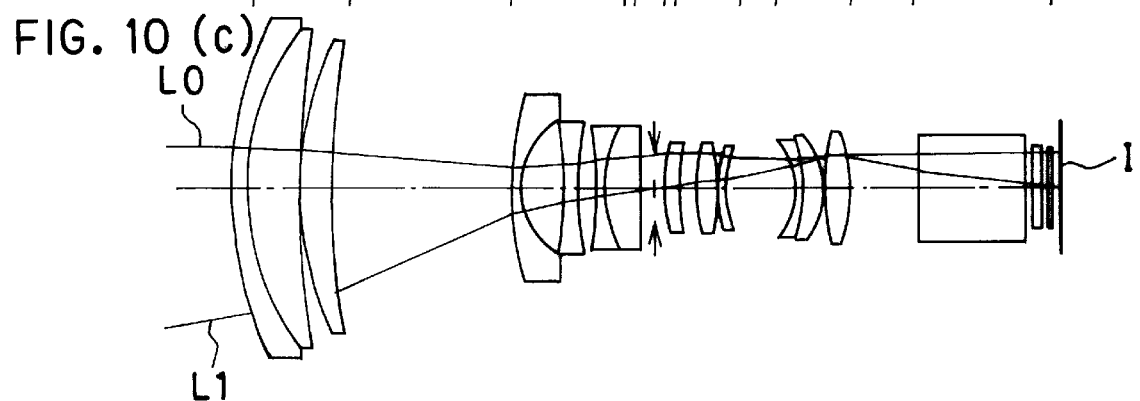

As shown in FIG. 10, the first lens group G1 consists of a doublet composed of a negative meniscus lens convex on the object side and a positive meniscus lens convex on the object side, and a positive meniscus lens convex on the object side, three in all. The second lens group G2 consists of a negative meniscus lens convex on the object side, a double-concave lens and a doublet composed of a double-concave lens and a double-convex lens, four in all. The third lens group G3 consists of a positive meniscus lens convex on the object side, a double-convex lens and a negative meniscus lens convex on the object side, three in all. The fourth lens group G4 consists of a doublet composed of a negative meniscus lens convex on the image side and a positive meniscus lens convex on the image side, and a double-convex lens, three in all. Two aspherical surfaces are used, one for the object-side surface of the double-convex lens in the third lens group G3 and another for the object-side surface of the double-convex lens in the fourth lens group G4.

Set out below are numerical data on Examples 1 to 10. The symbols used hereinafter but not hereinbefore have the following means:

f is a focal length of the overall system,
$F_{NO}$ is an F-number,
$\omega$ is a half field angle,
L is a distance from the final lens surface to the image plane,
$r_1, r_2, \ldots$ are radii of curvature of lens surfaces,
$d_1, d_2, \ldots$ are separations between adjacent lens surfaces,
$n_{d1}, n_{d2}, \ldots$ are d-line indices of refraction of lenses, and
$\nu_{d1}, \nu_{d2}, \ldots$ are d-line Abbe's numbers of lenses.

Here let x denote a positive direction of propagation of light and y represent a direction perpendicular to the optical axis. Then, aspherical shape is given by $$x=(y^2/r)/[1+\{1-(1+K)(y/r)^2\}^{1/2}]+A_4 y^4+A_6 y^6+A_8 y^8+A_{10} y^{10}$$

where r is a radius of paraxial curvature, K is a conical coefficient, and $A_4, A_6, A_8$ and $A_{10}$ are fourth-, sixth-, eighth- and tenth-order aspherical coefficients, respectively.

Example 1

$f = 9.200 \sim 18.200 \sim 35.500$
$F_{NO} = 2.007 \sim 2.176 \sim 2.328$
$\omega\ 34.0° \sim 18.1° \sim 9.4°$
$L = 1.290 \sim 1.290 \sim 1.290$

| | | | |
|---|---|---|---|
| $r_1 = 84.3229$ | $d_1 = 2.5000$ | $n_{d1} = 1.84666$ | $\nu_{d1} = 23.78$ |
| $r_2 = 46.9479$ | $d_2 = 7.2222$ | $n_{d2} = 1.61800$ | $\nu_{d2} = 63.33$ |
| $r_3 = 213.1431$ | $d_3 = 0.1500$ | | |
| $r_4 = 43.5892$ | $d_4 = 5.7376$ | $n_{d3} = 1.77250$ | $\nu_{d3} = 49.60$ |
| $r_5 = 120.8546$ | $d_5 =$ (Variable) | | |
| $r_6 = 65.4250$ | $d_6 = 1.8000$ | $n_{d4} = 1.77250$ | $\nu_{d4} = 49.60$ |
| $r_7 = 12.7426$ | $d_7 = 7.2504$ | | |
| $r_8 = 518.2953$ | $d_8 = \infty$ | $n_{d5} = 1.84666$ | $\nu_{d5} = 23.78$ |
| $r_9 = 73.8369$ | $d_9 = 2.2847$ | | |
| $r_{10} = -50.7599$ | $d_{10} = 1.4000$ | $n_d = 6\ 1.48749$ | $\nu_{d6} = 70.23$ |
| $r_{11} = 18.2832$ | $d_{11} = 4.0189$ | $n_{d7} = 1.80518$ | $\nu_{d7} = 25.42$ |
| $r_{12} = 106.5482$ | $d_{12} =$ (Variable) | | |
| $r_{13} =$ (Stop) | $d_{13} =$ (Variable) | | |
| $r_{14} = 34.7436$ | $d_{14} = 2.9677$ | $n_{d8} = 1.84666$ | $\nu_{d8} = 23.78$ |
| $r_{15} = -53.5590$ | $d_{15} = 0.1000$ | | |
| $r_{16} = 30.9459$ (Aspheric) | $d_{16} = 3.0469$ | $n_{d9} = 1.69350$ | $\nu_{d9} = 53.22$ |
| $r_{17} = -46.1260$ | $d_{17} = 0.2180$ | | |
| $r_{18} = -38.1348$ | $d_{18} = 1.0000$ | $n_{d10} = 1.80518$ | $\nu_{d10} = 25.42$ |
| $r_{19} = 20.7424$ | $d_{19} =$ (Variable) | | |
| $r_{20} = -13.5000$ | $d_{20} = 1.2940$ | $n_{d11} = 1.80518$ | $\nu_{d11} = 25.42$ |
| $r_{21} = -246.7759$ | $d_{21} = 3.8309$ | $n_{d12} = 1.61800$ | $\nu_{d12} = 63.33$ |
| $r_{22} = -20.3394$ | $d_{22} = 0.1303$ | | |
| $r_{23} = 61.8595$ | $d_{23} = 4.9657$ | $n_{d13} = 1.61800$ | $\nu_{d13} = 63.33$ |
| $r_{24} = -26.9518$ | $d_{24} = 0.6609$ | | |
| $r_{25} = 248.9494$ | $d_{25} = 2.7894$ | $n_{d14} = -1.69350$ | $\nu_{d14} = 53.22$ |
| $r_{26} = -39.8402$ (Aspheric) | $d_{26} =$ (Variable) | | |
| $r_{27} = \infty$ | $d_{27} = 24.0000$ | $n_{d15} = -1.51633$ | $\nu_{d15} = -64.14$ |
| $r_{28} = \infty$ | $d_{28} = 1.0000$ | | |
| $r_{29} = \infty$ | $d_{29} = 1.5700$ | $n_{d16} = -1.54771$ | $\nu_{d16} = 62.84$ |
| $r_{30} = \infty$ | $d_{30} = 1.0000$ | | |
| $r_{31} = \infty$ | $d_{31} = 0.8000$ | $n_{d17} = -1.52300$ | $\nu_{d17} = -55.00$ |
| $r_{32} = \infty$ | | | |

Zooming Spaces

| | | | |
|---|---|---|---|
| f | 9.200 | 18.200 | 35.500 |
| $d_5$ | 1.000 | 15.911 | 27.466 |
| $d_{12}$ | 31.555 | 16.623 | 5.088 |
| $d_{13}$ | 9.475 | 4.871 | 1.500 |
| $d_{19}$ | 6.748 | 8.658 | 9.436 |
| $d_{26}$ | 1.700 | 4.403 | 6.997 |

Aspherical Coefficients 16 th surface
K = 0
$A_4 = 8.0364 \times 10^{-6}$
$A_6 = 8.1241 \times 10^{-8}$
$A_8 = 1.9286 \times 10^{-9}$ -continued $A_{10} = 1.7517 \times 10^{-11}$
26th surface
$K = 0$
$A_4 = 1.4849 \times 10^{-5}$
$A_6 = 1.6305 \times 10^{-8}$
$A_8 = 8.0908 \times 10^{-11}$
$A_{10} = 1.6693 \times 10^{-13}$ Example 2

$f = 9.150 \sim 18.200 \sim 35.557$
$F_{NO} = 2.004 \sim 2.092 \sim 2.370$
$\omega = 34.2° = 17.8° = 9.3°$
$L = 1.140 = 1.140 = 1.140$

| | | | |
|---|---|---|---|
| $r_1 = 88.0125$ | $d_1 = 2.5000$ | $n_{d1} = 1.84666$ | $\nu_{d1} = 23.78$ |
| $r_2 = 44.3193$ | $d_2 = 8.3442$ | $n_{d2} = 1.61800$ | $\nu_{d2} = 63.33$ |
| $r_3 = 328.6587$ | $d_3 = \infty$ | | |
| $r_4 = 42.6643$ | $d_4 = 6.1864$ | $n_{d3} = 1.77250$ | $\nu_{d3} = 49.60$ |
| $r_5 = 143.0811$ | $d_5 = $ (Variable) | | |
| $r_6 = 100.6000$ | $d_6 = 1.8000$ | $n_{d4} = 1.77250$ | $\nu_{d4} = 49.60$ |
| $r_7 = 12.1553$ | $d_7 = 6.6743$ | | |
| $r_8 = 341.4398$ | $d_8 = 1.9748$ | $n_{d5} = 1.84666$ | $\nu_{d5} = 23.78$ |
| $r_9 = 41.4290$ | $d_9 = 1.9964$ | | |
| $r_{10} = 94.0340$ | $d_{10} = 1.4000$ | $n_{d6} = 1.48749$ | $\nu_{d6} = 70.23$ |
| $r_{11} = 16.5906$ | $d_{11} = 4.4572$ | $n_{d7} = 1.80518$ | $\nu_{d7} = 25.42$ |
| $r_{12} = 161.9209$ | $d_{12} = $ (Variable) | | |
| $r_{13} = $ (Stop) | $d_{13} = $ (Variable) | | |
| $r_{14} = 36.7198$ | $d_{14} = 2.6818$ | $n_{d8} = 1.84666$ | $\nu_{d8} = 23.78$ |
| $r_{15} = -85.9268$ | $d_{15} = 0.1868$ | | |
| $r_{16} = 42.6236$(Aspheric) | $d_{16} = 12.5522$ | $n_{d9} = -1.69350$ | $\nu_{d9} = 53.22$ |
| $r_{17} = -95.6892$ | $d_{17} = 0.1000$ | | |
| $r_{18} = -669.3908$ | $d_{18} = 1.0000$ | $n_{d10} = 1.77922$ | $\nu_{d10} = 26.17$ |
| $r_{19} = 27.8740$ | $d_{19} = $ (Variable) | | |
| $r_{20} = -14.5037$ | $d_{20} = 1.0000$ | $n_{d11} = 1.80518$ | $\nu_{d11} = 25.42$ |
| $r_{21} = 44.2454$ | $d_{21} = 3.8729$ | $n_{d12} = 1.61800$ | $\nu_{d12} = 63.33$ |
| $r_{22} = -25.8216$ | $d_{22} = 0.1000$ | | |
| $r_{23} = 76.0994$ | $d_{23} = 4.1032$ | $n_{d13} = 1.61800$ | $\nu_{d13} = 63.33$ |
| $r_{24} = -25.8258$ | $d_{24} = 0.1000$ | | |
| $r_{25} = 161.0207$ | $d_{25} = 3.3312$ | $n_{d14} = 1.69350$ | $\nu_{d14} = 53.22$ |
| $r_{26} = -33.5898$ (Aspheric) | $d_{26} = $ (Variable) | | |
| $r_{27} = \infty$ | $d_{27} = 24.0000$ | $n_{d15} = 1.51633$ | $\nu_{d15} = 64.14$ |
| $r_{28} = \infty$ | $d_{28} = 1.0000$ | | |
| $r_{29} = \infty$ | $d_{29} = 1.5700$ | $n_{d16} = 1.54771$ | $\nu_{d16} = 62.84$ |
| $r_{30} = \infty$ | $d_{30} = 1.0000$ | | |
| $r_{31} = \infty$ | $d_{31} = 0.8000$ | $n_{d17} = 1.52300$ | $\nu_{d17} = 55.00$ |
| $r_{32} = \infty$ | | | |

Zooming Spaces

| f | 9.150 | 18.200 | 35.557 |
|---|---|---|---|
| $d_5$ | 1.000 | 15.319 | 24.716 |
| $d_{12}$ | 26.727 | 12.420 | 2.996 |
| $d_{13}$ | 8.926 | 6.259 | 1.500 |
| $d_{19}$ | 7.315 | 7.490 | 9.724 |
| $d_{26}$ | 1.700 | 4.185 | 6.718 |

Aspherical Coefficients

16th surface
$K = 0$
$A_4 = -1.0199 \times 10^{-5}$
$A_6 = 4.9619 \times 10^{-8}$
$A_8 = -2.0009 \times 10^{-9}$
$A_{10} = 2.8851 \times 10^{-11}$
26th surface
$K = 0$
$A_4 = 1.6728 \times 10^{-5}$
$A_6 = 3.4245 \times 10^{-9}$
$A_8 = 5.9269 \times 10^{-11}$
$A_{10} = -9.6705 \times 10^{-13}$ Example 3

$f = 9.099 \sim 18.100 \sim 35.998$
$F_{NO} = 2.008 \sim 2.065 \sim 2.481$
$\omega = 34.2 \sim 17.9° \sim 9.3°$
$L = 1.290 = 1.290 = 1.290$

| | | | |
|---|---|---|---|
| $r_1 = 74.1213$ | $d_1 = 2.5000$ | $n_{d1} = 1.84666$ | $\nu d_1 = -23.78$ |
| $r_2 = 45.2920$ | $d_2 = 7.6976$ | $n_{d2} = 1.61800$ | $\nu d_2 = 63.33$ |

-continued

| | | | |
|---|---|---|---|
| $r_3 = 200.0000$ | $d_3 = 0.1500$ | | |
| $r_4 = 53.6322$ | $d_4 = 5.1636$ | $n_{d3} = 1.77250$ | $\nu d_3 = 49.60$ |
| $r_5 = 160.3763$ | $d_5 = $ (Variable) | | |
| $r_6 = 86.4469$ | $d_6 = 1.8938$ | $n_{d4} = 1.77250$ | $\nu d_4 = 49.60$ |
| $r_7 = 12.9947$ | $d_7 = 6.5582$ | | |
| $r_8 = -633.9388$ | $d_8 = 1.3849$ | $n_{d5} = 1.84666$ | $\nu d_5 = 23.78$ |
| $r_9 = 53.5036$ | $d_9 = 3.0086$ | | |
| $r_{10} = -70.1852$ | $d_{10} = 1.3000$ | $n_{d6} = 1.48749$ | $\nu d_6 = 70.21$ |
| $r_{11} = 19.4251$ | $d_{11} = 4.0971$ | $n_{d7} = 1.80518$ | $\nu d_7 = 25.42$ |
| $r_{12} = 567.6091$ | $d_{12} = $ (Variable) | | |
| $r_{13} = \infty$ (Stop) | $d_{13} = $ (Variable) | | |
| $r_{14} = 35.5332$ | $d_{14} = 2.9155$ | $n_{d8} = 1.84666$ | $\nu d_8 = 23.78$ |
| $r_{15} = 149.5334$ | $d_{15} = 1.9951$ | | |
| $r_{16} = 23.1874$ (Aspheric) | $d_{16} = 3.2540$ | $n_{d9} = 1.69350$ | $\nu d_9 = 53.20$ |
| $r_{17} = -136.5790$ | $d_{17} = 0.1509$ | | |
| $r_{18} = 54.2006$ | $d_{18} = 1.1258$ | $n_{d10} = 1.80518$ | $\nu d_{10} = 25.42$ |
| $r_{19} = 17.2110$ | $d_{19} = $ (Variable) | | |
| $r_{20} = -12.6096$ | $d_{20} = 1.1000$ | $n_{d11} = 1.80518$ | $\nu d_{11} = 25.42$ |
| $r_{21} = -55.3792$ | $d_{21} = 3.1600$ | $n_{d612} = 1.61800$ | $\nu d_{12} = 63.33$ |
| $r_{22} = -15.6001$ | $d_{22} = 0.1500$ | | |
| $r_{23} = 74.9447$ | $d_{23} = 3.2661$ | $n_{d13} = 1.61800$ | $\nu d_{13} = 63.33$ |
| $r_{24} = -30.4739$ | $d_{24} = 0.1500$ | | |
| $r_{25} = 124.0475$ | $d_{25} = 2.5117$ | $n_{14} = 1.69350$ | $\nu d_{14} = 53.20$ |
| $r_{26} = -68.0400$ (Aspheric) | $d_{26} = $ (Variable) | | |
| $r_{27} = \infty$ | $d_{27} = 24.0000$ | $n_{d15} = 1.51633$ | $\nu d_{15} = 64.14$ |
| $r_{28} = \infty$ | $d_{28} = 1.0000$ | | |
| $r_{29} = \infty$ | $d_{29} = 1.5700$ | $n_{d16} = 1.54771$ | $\nu d_{16} = 62.84$ |
| $r_{30} = \infty$ | $d_{30} = 1.0000$ | | |
| $r_{31} = \infty$ | $d_{31} = 0.8000$ | $n_{d17} = 1.52300$ | $\nu d17 = 55.00$ |
| $r_{32} = \infty$ | | | |

Zooming Spaces

| | | | |
|---|---|---|---|
| f | 9.099 | 18.100 | 35.998 |
| $d_5$ | 1.006 | 18.105 | 28.360 |
| $d_{12}$ | 28.950 | 11.850 | 1.597 |
| $d_{13}$ | 12.005 | 9.317 | 1.499 |
| $d_{19}$ | 7.213 | 7.088 | 10.629 |
| $d_{26}$ | 1.500 | 4.313 | 8.589 |

Aspherical Coefficients 16 th surface
k = 0
$A_4 = -1.3659 \times 10^{-5}$
$A_6 = -5.3156 \times 10^{-9}$
$A_8 = -2.4548 \times 10^{-11}$
$A_{10} = 2.2544 \times 10^{-12}$
26 th surface
K = 0
$A_4 = = 6.6763 \times 10^{-6}$
$A_6 = 3.7977 \times 10^{-8}$
$A_8 = -4.9995 \times 10^{-10}$
$A_{10} = 2.3437 \times 10^{-12}$ Example 4

$f = 9.100 \sim 18.099 \sim 35.999$
$F_{NO} = 2.040 \sim 2.169 \sim 2.567$
$\omega = 34.2° \sim 17.7° \sim 9.2°$
$L = 1.290 \sim 1.290 \sim 1.290$

| | | | |
|---|---|---|---|
| $r_1 = 74.8822$ | $d_1 = 2.5000$ | $n_{d1} = 1.84666$ | $\nu_{d1} = 23.78$ |
| $r_2 = 43.0184$ | $d_2 = 7.7167$ | $n_{d2} = 1.61800$ | $\nu_{d2} = 63.33$ |
| $r_3 = 215.4918$ | $d_3 = 0.1500$ | | |
| $r_4 = 56.6744$ | $d_4 = 5.2608$ | $n_{d3} = 1.78800$ | $\nu_{d3} = 47.37$ |
| $r_5 = 210.6354$ | $d_5 = $ (Variable) | | |
| $r_6 = 115.8384$ | $d_6 = 1.9000$ | $n_{d4} = 1.77250$ | $\nu_{d4} = 49.60$ |
| $r_7 = 13.4369$ | $d_7 = 6.6384$ | | |
| $r_8 = -184.0079$ | $d_8 = 1.4000$ | $n_{d5} = 1.84666$ | $\nu_{d5} = 23.78$ |
| $r_9 = 51.9993$ | $d_9 = 3.0871$ | | |
| $r_{10} = -70.1095$ | $d_{10} = 1.3000$ | $n_{d6} = 1.48749$ | $\nu_{d6} = 70.21$ |
| $r_{11} = 20.8898$ | $d_{11} = 4.1000$ | $n_{d7} = 1.80518$ | $\nu_{d7} = 25.42$ |
| $r_{12} = -225.1451$ | $d_{12} = $ (Variable) | | |
| $r_{13} = \infty$ (Stop) | $d_{13} = $ (Variable) | | |
| $r_{14} = 282.5453$ | $d_{14} = 3.7429$ | $n_{d8} = 1.84666$ | $\nu_{d8} = 23.78$ |
| $r_{15} = -130.6731$ | $d_{15} = 3.2521$ | | |
| $r_{16} = 14.8931$ (Aspheric) | $d_{16} = 3.4036$ | $n_{d9} = 1.69350$ | $\nu_{d9} = 53.20$ |
| $r_{17} = 55.3558$ | $d_{17} = 0.1500$ | | |
| $r_{18} = 31.8221$ | $d_{18} = 0.9821$ | $n_{d10} = 1.53172$ | $\nu_{d10} = 48.84$ |
| $r_{19} = 12.5428$ | $d_{19} = $ (Variable) | | |

-continued

| | | | |
|---|---|---|---|
| $r_{20} = -37.2538$ | $d_{20} = 1.1000$ | $n_{d11} = 1.80518$ | $v_{d11} = 25.42$ |
| $r_{21} = 22.6199$ | $d_{21} = 3.6567$ | $n_{d12} = 1.61800$ | $v_{d12} = 63.33$ |
| $r_{22} = -51.9180$ | $d_{22} = 0.1500$ | | |
| $r_{23} = 58.1250$ | $d_{23} = 3.1659$ | $n_{d13} = 1.61800$ | $v_{d13} = 63.33$ |
| $r_{24} = -47.9539$ | $d_{24} = 0.1500$ | | |
| $r_{25} = 49.8160$ | $d_{25} = 3.0850$ | $n_{d14} = 1.69350$ | $v_{d14} = 53.20$ |
| $r_{26} = -68.4373$ (Aspheric) | $d_{26} =$ (Variable) | | |
| $r_{27} = \infty$ | $d_{27} = 24.0000$ | $n_{d15} = 1.51633$ | $v_{d15} = 64.14$ |
| $r_{28} = \infty$ | $d_{28} = 1.0000$ | | |
| $r_{29} = \infty$ | $d_{29} = 1.5700$ | $n_{d16} = 1.54771$ | $v_{d16} = 62.84$ |
| $r_{30} = \infty$ | $d_{30} = 1.0000$ | | |
| $r_{31} = \infty$ | $d_{31} = 0.8000$ | $n_{d17} = 1.52300$ | $v_{d17} = 55.00$ |
| $r_{32} = \infty$ | | | |

Zooming Spaces

| | | | |
|---|---|---|---|
| f | 9.100 | 18.099 | 35.999 |
| $d_5$ | 1.000 | 17.410 | 28.125 |
| $d_{12}$ | 28.955 | 12.545 | 1.830 |
| $d_{13}$ | 12.997 | 9.060 | 1.500 |
| $d_{19}$ | 5.987 | 7.331 | 11.164 |
| $d_{26}$ | 1.500 | 4.093 | 7.821 |

Aspherical Coefficients
16 th surface
$K = 0$
$A_4 = -1.3206 \times 10^{-5}$
$A_6 = -3.4393 \times 10^{-8}$
$A_8 = -8.8948 \times 10^{-11}$
$A_{10} = -1.1390 \times 10^{-12}$
26 th surface
$K = 0$
$A_4 = 5.9803\ 33\ 10^{-6}$
$A_6 = -1.6502 \times 10^{-8}$
$A_8 = 1.1359 \times 10^{-10}$
$A_{10} = -8.3588 \times 10^{-13}$ Example 5

$f = 9.100 \sim 18.100 \sim 36.000$
$F_{NO} = 2.040 \sim 2.093 \sim 2.599$
$\omega = 34.2 \sim 18.1° \sim 9.3°$
$L = 1.290 \sim 1.290 \sim 1.290$

| | | | |
|---|---|---|---|
| $r_1 = 58.8001$ | $d_1 = 2.5000$ | $n_{d1} = 1.84666$ | $v_{d1} = 23.78$ |
| $r_2 = 40.6745$ | $d_2 = 7.4149$ | $n_{d2} = 1.61800$ | $v_{d2} = 63.33$ |
| $r_3 = 143.8004$ | $d_3 = 0.1500$ | | |
| $r_4 = 49.8669$ | $d_4 = 5.5102$ | $n_{d3} = 1.60311$ | $v_{d3} = 60.64$ |
| $r_5 = 149.0443$ | $d_5 =$ (Variable) | | |
| $r_6 = 94.2557$ | $d_6 = 1.9000$ | $n_{d4} = 1.77250$ | $v_{d4} = 49.60$ |
| $r_7 = 12.6362$ | $d_7 = 6.4931$ | | |
| $r_8 = -58.7764$ | $d_8 = 1.2804$ | $n_{d5} = 1.68893$ | $v_{d5} = 31.07$ |
| $r_9 = 33.0926$ (Aspheric) | $d_9 = 2.9913$ | | |
| $r_{10} = 68.3970$ | $d_{10} = 1.3000$ | $n_{d6} = 1.48749$ | $v_{d6} = 70.21$ |
| $r_{11} = 24.1010$ | $d_{11} = 4.1942$ | $n_{d7} = 1.84666$ | $v_{d7} = 23.78$ |
| $r_{12} = \infty$ | $d_{12} =$ (Variable) | | |
| $r_{13} = \infty$ (Stop) | $d_{13} =$ (Variable) | | |
| $r_{14} = 51.3225$ (Aspheric) | $d_{14} = 2.7711$ | $n_{d8} = 1.68893$ | $v_{d8} = 31.07$ |
| $r_{15} = -90.3240$ | $d_{15} = 2.0186$ | | |
| $r_{16} = 28.0506$ | $d_{16} = 3.1787$ | $n_{d9} = 1.69350$ | $v_{d9} = 53.20$ |
| $r_{17} = -2636.8632$ | $d_{17} = 0.1500$ | | |
| $r_{18} = 39.1864$ | $d_{18} = 1.1258$ | $n_{d10} = 1.80518$ | $v_{d10} = 25.42$ |
| $r_{19} = 19.3955$ | $d_{19} =$ (Variable) | | |
| $r_{20} = -12.9017$ | $d_{20} = 1.1000$ | $n_{d11} = 1.80518$ | $v_{d11} = 25.42$ |
| $r_{21} = -80.1346$ | $d_{21} = 3.2462$ | $n_{d12} = 1.61800$ | $v_{d12} = 63.33$ |
| $r_{22} = -16.4092$ | $d_{22} = 0.1500$ | | |
| $r_{23} = 107.9466$ | $d_{23} = 3.4803$ | $n_{d13} = 1.61800$ | $v_{d13} = 63.33$ |
| $r_{24} = -24.7860$ | $d_{24} = 10.1500$ | | |
| $r_{26} = -1955.5129$ (Aspheric) | $d_{25} = 2.2026$ | $n_{d14} = 1.69350$ | $v_{d14} = 53.20$ |
| $r_{26} = -56.6045$ | $d_{26} =$ (Variable) | | |
| $r_{27} = \infty$ | $d_{27} = 24.0000$ | $n_{d15} = 1.51633$ | vd15 = 64.14 |
| $r_{28} = \infty$ | $d_{28} = 1.0000$ | | |
| $r_{29} = \infty$ | $d_{29} = 1.5700$ | $n_{d16} = 1.54771$ | vd16 = 62.84 |
| $r_{30} = \infty$ | $d_{30} = 1.0000$ | | |
| $r_{31} = \infty$ | $d_{31} = 0.8000$ | $n_{d17} = 1.52300$ | $v_{d1\ 7}55.00$ |
| $r_{32} = \infty$ | | | |

Zooming Spaces

| | | | |
|---|---|---|---|
| f | 9.100 | 18.100 | 36.000 |
| $d_5$ | 1.000 | 18.485 | 28.276 |
| $d_{12}$ | 28.776 | 11.291 | 1.500 |

-continued

|     | | | |
|---|---|---|---|
| $d_{13}$ | 12.684 | 10.109 | 1.500 |
| $d_{19}$ | 7.079 | 6.944 | 11.499 |
| $d_{26}$ | 1.500 | 4.210 | 8.264 |

Aspherical Coefficients 9 th surface
$K = 0$
$A_4 = -1.2364 \times 10^{-5}$
$A_6 = -1.4056 \times 10^{-8}$
$A_8 = -5.7130 \times 10^{-11}$
$A_{10} = 0.0000$
14 th surface
$K = 0$
$A_4 = -5.5129 \times 10^{-6}$
$A_6 = 6.5311 \times 10^{-9}$
$A_8 = 5.0873 \times 10^{-11}$
$A_{10} = 6.3550 \times 10^{-13}$
25 th surface
$K = 0$
$A_4 = -1.1733 \times 10^{-5}$
$A_6 = -6.9855 \times 10^{-10}$
$A_8 = -1.0064 \times 10^{-10}$
$A_{10} = 2.3018 \times 10^{-13}$ Example 6

$f = 9.100 \sim 18.100 \sim 36.000$
$F_{NO} = 2.040 \sim 2.107 \sim 2.628$
$\omega = 34.0° \sim 17.8° \sim 9.2°$
$L = 1.290 \sim 1.290 \sim 1.290$

| | | | |
|---|---|---|---|
| $r_1 = 77.1673$ | $d_1 = 2.5000$ | $n_{d1} = 1.84666$ | $\nu_{d1} = 23.78$ |
| $r_2 = 44.5542$ | $d_2 = 7.2897$ | $n_{d2} = 1.61800$ | $\nu_{d2} = 63.33$ |
| $r_3 = 175.2786$ | $d_3 = 0.1500$ | | |
| $r_4 = 58.1396$ | $d_4 = 5.1545$ | $n_{d3} = 1.78800$ | $\nu_{d3} = 47.37$ |
| $r_5 = 217.1676$ | $d_5 =$ (Variable) | | |
| $r_6 = 55.6725$ | $d_6 = 1.9000$ | $n_{d4} = 1.77250$ | $\nu_{d4} = 49.60$ |
| $r_7 = 12.4573$ | $d_7 = 8.1880$ | | |
| $r_8 = -59.8148$ | $d_8 = 1.3000$ | $n_{d5} = 1.48749$ | $\nu_{d5} = 70.21$ |
| $r_9 = 15.0090$ | $d_9 = 4.1000$ | $n_{d6} = 1.80518$ | $\nu_{d6} = 25.42$ |
| $r_{10} = 60.0263$ | $d_{10} = 1.9444$ | | |
| $r_{11} = -43.8555$ | $d_{11} = 1.4328$ | $n_{d7} = 1.84666$ | $\nu_{d7} = 23.78$ |
| $r_{12} = -73.9217$ | $d_{12} =$ (Variable) | | |
| $r_{13} =$ (Stop) | $d_{13} =$ (Variable) | | |
| $r_{14} = 63.0119$ | $d_{14} = 2.8541$ | $n_{d8} = 1.84666$ | $\nu d8 = 23.78$ |
| $r_{15} = 106.3279$ | $d_{15} = 1.7565$ | | |
| $r_{16} = 23.3700$ (Aspheric) | $d_{16} = 3.3020$ | $n_{d9} = 1.69350$ | $\nu_{d9} = 53.20$ |
| $r_{17} = -80.2704$ | $d_{17} = 0.1500$ | | |
| $r_{18} = 39.1893$ | $d_{18} = 1.1258$ | $n_{d10} = 1.80518$ | $\nu_{d10} = 25.42$ |
| $r_{19} = 20.1784$ | $d_{19} =$ (Variable) | | |
| $r_{20} = -14.6859$ | $d_{20} = 1.0353$ | $n_{d11} = 1.69895$ | $\nu_{d11} = 30.13$ |
| $r_{21} = -773.6730$ | $d_{21} = 3.4490$ | $n_{d12} = 1.61800$ | $\nu_{d12} = 63.33$ |
| $r_{22} = -18.5002$ | $d_{22} = 0.1500$ | | |
| $r_{23} = 56.1147$ | $d_{23} = 3.6472$ | $n_{d13} = 1.61800$ | $\nu_{d13} = 63.33$ |
| $r_{24} = -29.5271$ | $d_{24} = 0.1500$ | | |
| $r_{25} = 90.5592$ (Aspheric) | $d_{25} = 1.8358$ | $n_{d14} = 1.69350$ | $\nu_{d14} = 53.20$ |
| $r_{26} = 541.4610$ | $d_{26} =$ (Variable) | | |
| $r_{27} = \infty$ | $d_{27} = 24.0000$ | $n_{d15} = 1.51633$ | $\nu_{d15} = 64.14$ |
| $r_{28} = \infty$ | $d_{28} = 1.0000$ | | |
| $r_{29} = \infty$ | $d_{29} = 1.5700$ | $n_{d16} = 1.54771$ | $\nu_{d16} = 62.84$ |
| $r_{30} = \infty$ | $d_{30} = 1.0000$ | | |
| $r_{31} = \infty$ | $d_{31} = 0.8000$ | $n_{d17} = 1.52300$ | $\nu_{d17} = 55.00$ |
| $r_{32} = \infty$ | | | |

Zooming Spaces

| | | | |
|---|---|---|---|
| f | 9.100 | 18.100 | 36.000 |
| $d_5$ | 1.000 | 18.301 | 27.797 |
| $d_{12}$ | 28.505 | 11.203 | 1.708 |
| $d_{13}$ | 12.560 | 10.025 | 1.500 |
| $d_{19}$ | 7.123 | 6.596 | 9.873 |
| $d_{26}$ | 1.517 | 4.579 | 9.828 |

Aspherical Coefficients 16 th surface
$K = 0$
$A_4 = -1.4804 \times 10^{-6}$
$A_6 = -3.2374 \times 10^{-8}$
$A_8 = 5.5973 \times 10^{-10}$
$A_{10} = -3.8332 \times 10^{-12}$ 25 th surface
K = 0
$A_4 = -1.0687 \times 10^{-5}$
$A_6 = 9.9935 \times 10^{-9}$
$A_8 = -3.8275 \times 10^{-10}$
$A_{10} = 1.6374 \times 10^{-12}$ Example 7

$f = 9.172 \sim 18.399 \sim 35.299$
$F_{NO} = 2.00 \sim 2.15 \sim 2.49$
$\omega = 33.7° \sim 17.7° \sim 9.5°$
$L = 1.24 \sim 1.24 \sim 1.24$

| | | | |
|---|---|---|---|
| $r_1 = 95.862$ | $d_1 = 2.50$ | $n_{d1} = 1.84666$ | $\nu_{d1} = 23.78$ |
| $r_2 = 58.673$ | $d_2 = 7.09$ | $n_{d2} = 1.61800$ | $\nu_{d2} = 63.33$ |
| $r_3 = 1197.278$ | $d_3 = 0.20$ | | |
| $r_4 = 44.543$ | $d_4 = 5.59$ | $n_{d3} = 1.60311$ | $\nu_{d3} = 60.64$ |
| $r_5 = 111.982$ | $d_5 = $ (Variable) | | |
| $r_6 = 83.735$ | $d_6 = 1.85$ | $n_{d4} = 1.75700$ | $\nu_{d4} = 47.82$ |
| $r_7 = 12.683$ | $d_7 = 6.33$ | | |
| $r_8 = -443.913$ | $d_8 = 1.30$ | $n_{d5} = 1.84666$ | $\nu_{d5} = 23.78$ |
| $r_9 = 40.535$ | $d_9 = 2.99$ | | |
| $r_{10} = -91.243$ | $d_{10} = 1.20$ | $n_{d6} = 1.48749$ | $\nu_{d6} = 70.21$ |
| $r_{11} = 18.950$ | $d_{11} = 4.23$ | $n_{d7} = 1.80518$ | $\nu d7 = 25.42$ |
| $r_{12} = -716.067$ | $d_{12} = $ (Variable) | | |
| $r_{13} = $ (Stop) | $d_{13} = $ (Variable) | | |
| $r_{14} = 40.253$ | $d_{14} = 2.10$ | $n_{d8} = 1.84666$ | $\nu_{d8} = 23.78$ |
| $r_{15} = 126.102$ | $d_{15} = 2.34$ | | |
| $r_{16} = 18.770$ (Aspheric) | $d_{16} = 3.00$ | $n_{d9} = 1.69350$ | $\nu_{d9} = 53.20$ |
| $r_{17} = -352.754$ | $d_{17} = 0.15$ | | |
| $r_{18} = 29.237$ | $d_{18} = 1.12$ | $n_{d10} = 1.80518$ | $\nu_{d10} = 25.42$ |
| $r_{19} = 14.039$ | $d_{19} = $ (Variable) | | |
| $r_{20} = -12.238$ | $d_{20} = 1.10$ | $n_{d11} = 1.80518$ | $\nu_{d11} = -25.42$ |
| $r_{21} = -39.650$ | $d_{21} = 3.29$ | $n_{d12} = 1.61800$ | $\nu_{d12} = -63.33$ |
| $r_{22} = -13.820$ | $d_{22} = 0.15$ | | |
| $r_{23} = 66.972$ | $d_{23} = 3.28$ | $n_{d13} = 1.49700$ | $\nu_{d13} = -81.54$ |
| $r_{24} = -39.739$ | $d_{24} = 0.15$ | | |
| $r_{25} = 85.005$ | $d_{25} = 2.70$ | $n_{d14} = 1.69350$ | $\nu_{d14} = 53.20$ |
| $r_{26} = -90.004$ (Aspheric) | $d_{26} = $ (Variable) | | |
| $r_{27} = \infty$ | $d_{27} = 17.00$ | $n_{d15} = 1.51633$ | $\nu_{d15} = 64.14$ |
| $r_{28} = \infty$ | $d_{28} = 1.00$ | | |
| $r_{29} = \infty$ | $d_{29} = 1.60$ | $n_{d16} = 1.54771$ | $\nu_{d16} = 62.84$ |
| $r_{30} = \infty$ | $d_{30} = 1\ 00$ | | |
| $r_{31} = \infty$ | $d_{31} = 0.75$ | $n_{d17} = 1.52300$ | $\nu_{d17} = 755.00$ |
| $r_{32} = \infty$ | | | |

Zooming Spaces

| f | 9.172 | 18.399 | 35.299 |
|---|---|---|---|
| $d_5$ | 1.18 | 18.24 | 28.42 |
| $d_{12}$ | 29.73 | 12.67 | 2.50 |
| $d_{13}$ | 12.41 | 9.05 | 2.67 |
| $d_{19}$ | 6.77 | 7.11 | 9.47 |
| $d_{26}$ | 5.81 | 8.82 | 12.85 |

Aspherical Coefficients 16 th surface
K = 0.000
$A_4 = -1.39980 \times 10^{-5}$
$A_6 = -3.59212 \times 10^{-8}$
$A_8 = 2.09088 \times 10^{-10}$
$A_{10} = -1.47843 \times 10^{-12}$
26 th surface
K = 0.000
$A_4 = 6.50753 \times 10^{-6}$
$A_6 = -7.11091 \times 10^{-9}$
$A_8 = 8.54427 \times 10^{-11}$
$A_{10} = -9.41415 \times 10^{-13}$ Example 8

$f = 9.160 \sim 18.420 \sim 35.300$
$F_{NO} = 2.00 \sim 2.13 \sim 2.45$
$\omega\ 34.1° \sim 17.8° \sim 9.5°$
$L = 1.24 \sim 1.24 \sim 1.24$

| | | | |
|---|---|---|---|
| $r_1 = 82.273$ | $d_1 = 2.50$ | $n_{d1} = 1.84666$ | $\nu_{d1} = 23.78$ |
| $r_2 = 51.000$ | $d_2 = 7.51$ | $n_{d2} = 1.61800$ | $\nu_{d2} = 63.33$ |
| $r_3 = 311.967$ | $d_3 = 0.20$ | | |

-continued

| | | | |
|---|---|---|---|
| $r_4 = 48.348$ | $d_4 = 5.24$ | $n_{d3} = 1.69680$ | $\nu_{d3} = 55.53$ |
| $r_5 = 127.440$ | $d_5 =$ (Variable) | | |
| $r_6 = 92.984$ | $d_6 = 1.86$ | $n_{d4} = 1.75700$ | $\nu_{d4} = 47.82$ |
| $r_7 = 12.801$ | $d_7 = 6.20$ | | |
| $r_8 = \infty$ | $d_8 = 1.44$ | $n_{d5} = 1.84666$ | $\nu_{d5} = 23.78$ |
| $r_9 = 40.785$ | $d_9 = 2.60$ | | |
| $r_{10} = -87.048$ | $d_{10} = 1.30$ | $n_{d6} = 1.48749$ | $\nu_{d6} = 70.21$ |
| $r_{11} = 18.302$ | $d_{11} = 4.34$ | $n_{d7} = 1.80518$ | $\nu_{d7} = 25.42$ |
| $r_{12} = \infty$ | $d_{12} =$ (Variable) | | |
| $r_{13} = \infty$ (Stop) | $d_{13} =$ (Variable) | | |
| $r_{14} = 41.360$ | $d_{14} = 2.55$ | $n_{d8} = 1.84666$ | $\nu_{d8} = 23.78$ |
| $r_{15} = 110.200$ | $d_{15} = 2.21$ | | |
| $r_{16} = 20.730$ (Aspheric) | $d_{16} = 3.20$ | $n_{d9} = 1.69350$ | $\nu_{d9} = 53.20$ |
| $r_{17} = -200.434$ | $d_{17} = 0.15$ | | |
| $r_{18} = 30.929$ | $d_{18} = 1.12$ | $n_{d10} = 1.80518$ | $\nu_{d10} = 25.42$ |
| $r_{19} = 15.082$ | $d_{19} =$ (Variable) | | |
| $r_{20} = -11.234$ | $d_{20} = 1.10$ | $n_{d11} = 1.80518$ | $\nu_{d11} = 25.42$ |
| $r_{21} = -30.929$ | $d_{21} = 3.29$ | $n_{d12} = 1.61800$ | $\nu_{d12} = 63.33$ |
| $r_{22} = -13.067$ | $d_{22} = 0.15$ | | |
| $r_{23} = 59.024$ | $d_{23} = 3.33$ | $n_{d13} = 1.49700$ | $\nu_{d13} = 81.54$ |
| $r_{24} = -36.069$ | $d_{24} = 0.15$ | | |
| $r_{25} = 95.008$ | $d_{25} = 2.53$ | $n_{d14} = 1.69350$ | $\nu_{d14} = 53.20$ |
| $r_{26} = -74.694$ (Aspheric) | $d_{26} =$ (Variable) | | |
| $r_{27} = \infty$ | $d_{27} = 17.00$ | $n_{d15} = 1.51633$ | $\nu_{d15} = 64.14$ |
| $r_{28} = \infty$ | $d_{28} = 1.0Q$ | | |
| $r_{29} = \infty$ | $d_{29} = 1.60$ | $n_{d16} = 1.54771$ | $\nu_{d16} = 62.84$ |
| $r_{30} = \infty$ | $d_{30} = 1.00$ | | |
| $r_{31} = \infty$ | $d_{31} = 0.75$ | $n_{d17} = 1.52300$ | $\nu_{d17} = 55.00$ |
| $r_{32} = \infty$ | | | |

Zooming Spaces

| | | | |
|---|---|---|---|
| f | 9.160 | 18.420 | 35.300 |
| $d_5$ | 1.13 | 18.16 | 28.36 |
| $d_{12}$ | 29.49 | 12.46 | 2.26 |
| $d_{13}$ | 11.25 | 7.93 | 1.46 |
| $d_{19}$ | 7.10 | 7.57 | 10.25 |
| $d_{26}$ | 6.27 | 9.13 | 12.91 |

Aspherical Coefficients 16 th surface
$K = 0.000$
$A_4 = -1.22450 \times 10^{-5}$
$A_6 = -1.90460 \times 10^{-1}$
$A_8 = 2.27690 \times 10^{-10}$
$A_{10} = -1.33730 \times 10^{-2}$
26 th surface
$K = 0.000$
$A_4 = 6.88980 \times 10^{-6}$
$A_6 = 6.09190 \times 10^{-9}$
$A_8 = -1.15820 \times 10^{-10}$
$A_{10} = -4.10140 \times 10^{-13}$ Example 9

$f = 9.160 \sim 18.420 \sim 35.300$
$F_{NO} = 2.054 \sim 2.151 \sim 2.489$
$\omega = 33.5° \sim 17.8° \sim 9.5°$
$L = 1.240 \sim 1.240 \sim 1.240$

| | | | |
|---|---|---|---|
| $r_1 = 68.6817$ | $d_1 = 2.8000$ | $n_{d1} = 1.84666$ | $\nu_{d1} = 23.78$ |
| $r_2 = 45.6399$ | $d_2 = 8.0814$ | $n_{d2} = 1.61800$ | $\nu_{d2} = 63.33$ |
| $r_3 = 226.7373$ | $d_3 = 0.2000$ | | |
| $r_4 = 49.1649$ | $d_4 = 5.1284$ | $n_{d3} = 1.60311$ | $\nu_{d3} = 60.64$ |
| $r_5 = 119.8605$ | $d_5 =$ (Variable) | | |
| $r_6 = 64.4681$ | $d_6 = 1.7754$ | $n_{d4} = 1.75700$ | $\nu_{d4} = 47.82$ |
| $r_7 = 12.8109$ | $d_7 = 6.3325$ | | |
| $r_8 = 276.8192$ | $d_8 = 136461$ | $n_{d5} = 1.84666$ | $\nu_{d5} = 23.78$ |
| $r_9 = 41.3351$ | $d_9 = 2.5797$ | | |
| $r_{10} = 78.8208$ | $d_{10} = 1.2500$ | $n_{d6} = 1.48749$ | $\nu_{d6} = 70.21$ |
| $r_{11} = 17.5742$ | $d_{11} = 5.4681$ | $n_{d7} = 1.80518$ | $\nu_{d7} = 25.42$ |
| $r_{12} = 210.1617$ | $d_{12} =$ (Variable) | | |
| $r_{13} =$ (Stop) | $d_{13} =$ (Variable) | | |
| $r_{14} = 26.9931$ | $d_{14} = 2.5500$ | $n_{d8} = 1.80518$ | $\nu_{d8} = 25.42$ |
| $r_{15} = 53.7813$ | $d_{15} = 2.4270$ | | |
| $r_{16} = 22.0535$ (Aspheric) | $d_{16} = 3.3878$ | $n_{d9} = 1.69350$ | $\nu_{d9} = 53.20$ |
| $r_{17} = -92.9959$ | $d_{17} = 0.1500$ | | |
| $r_{18} = 39.6778$ | $d_{18} = 0.9895$ | $n_{d10} = 1.80518$ | $vd10 = 25.42$ |
| $r_{19} = 15.4071$ | $d_{19} =$ (Variable) | | |
| $r_{20} = -10.1173$ | $d_{20} = 1.0337$ | $n_{d12} = 1.80518$ | $\nu_{d11} = 25.42$ |

-continued

| | | | |
|---|---|---|---|
| $r_{21} = -19.4244$ | $d_{21} = 3.3259$ | $n_{d12} = 1.61800$ | $\nu_{d12} = 63.33$ |
| $r_{22} = -11.6334$ | $d_{22} = 0.1500$ | | |
| $r_{23} = 24.8042$ | $d_{23} = 4.6073$ | $n_{d13} = 1.49700$ | $\nu_{d13} = 81.54$ |
| $r_{24} = -28.4393$ (Aspheric) | $d_{24} =$ (Variable) | | |
| $r_{25} = \infty$ | $d_{25} = 17.0000$ | $n_{d14} = 1.51633$ | $\nu_{d14} = 64.14$ |
| $r_{26} = \infty$ | $d_{26} = 1.0000$ | | |
| $r_{27} = \infty$ | $d_{27} = 1.6000$ | $n_{d15} = 1.54771$ | $vd15 = 62.84$ |
| $r_{28} = \infty$ | $d_{28} = 1.0000$ | | |
| $r_{29} = \infty$ | $d_{29} = 0.7500$ | $n_{d16} = 1.52300$ | $\nu_{d16} = 55.00$ |
| $r_{30} = \infty$ | | | |

Zooming Spaces

| | | | |
|---|---|---|---|
| f | 9.160 | 18.420 | 35.300 |
| $d_5$ | 0.8804 | 18.7111 | 29.5520 |
| $d_{12}$ | 30.9303 | 13.0996 | 2.2587 |
| $d_{13}$ | 11.1877 | 7.7807 | 1.4564 |
| $d_{19}$ | 7.3958 | 7.9450 | 10.4206 |
| $d_{24}$ | 5.5660 | 8.4238 | 12.2724 |

Aspherical Coefficients 16 th surface
K = 0
$A_4 = -2.1816 \times 10^{-5}$
$A_6 = 9.8035 \times 10^{-8}$
$A_8 = -2.5355 \times 10^{-9}$
$A_{10} = -1.9054 \times 10^{-11}$
24 th surface
K = 0
$A_4 = 3.0621 \times \times 10^{-5}$
$A_5 = 6.6393 \times \times 10^{-8}$
$A_8 = -1.0798 \times 10^{-9}$
$A_{10} = -5.0284 \times 10^{-12}$ Example 10

$$f = 9.160 \sim 18.421 \sim 35.299$$
$$F_{NO} = 2.050 \sim 2.292 \sim 2.652$$
$$\omega = 33.7° = 17.9° = 9.5°$$
$$L = 1.240 \sim 1.240 \sim 1.240$$

| | | | |
|---|---|---|---|
| $r_1 = 58.0731$ | $d_1 = 2.8000$ | $n_{d1} = 1.84666$ | $\nu_{d1} = 23.78$ |
| $r_2 = 41.1526$ | $d_2 = 8.3181$ | $n_{d2} = 1.61800$ | $\nu_{d2} = 63.33$ |
| $r_3 = 143.3564$ | $d_3 = 0.2000$ | | |
| $r_4 = 52.0209$ | $d_4 = 5.0104$ | $n_{d3} = 1.60311$ | $\nu_{d3} = 60.64$ |
| $r_5 = 113.2265$ | $d_5 =$ (Variable) | | |
| $r_6 = 54.2533$ | $d_6 = 1.8721$ | $n_{d4} = 1.72916$ | $\nu_{d4} = 54.68$ |
| $r_7 = 12.7296$ | $d_7 = 6.7529$ | | |
| $r_8 = -95.8791$ | $d_8 = 2.4875$ | $n_{d5} = 1.84666$ | $\nu_{d5} = 23.78$ |
| $r_9 = 57.8600$ | $d_9 = 3.0164$ | | |
| $r_{10} = -96.1030$ | $d_{10} = 1.2500$ | $n_{d6} = 1.48749$ | $\nu_{d6} = 70.21$ |
| $r_{11} = 20.9520$ | $d_{11} = 6.0000$ | $n_{d7} = 1.80518$ | $\nu_{d7} = 25.42$ |
| $r_{12} = -684.6836$ | $d_{12} =$ (Variable) | | |
| $r_{13} = \infty$ (Stop) | $d_{13} =$ (Variable) | | |
| $r_{14} = 25.1714$ | $d_{14} = 2.5500$ | $n_{d8} = 1.80518$ | $\nu_{d8} = 25.42$ |
| $r_{15} = 37.7119$ | $d_{15} = 2.6185$ | | |
| $r_{16} = 21.7475$ (Aspheric) | $d_{16} = 3.6553$ | $n_{d9} = 1.69350$ | $\nu_{d9} = 53.20$ |
| $r_{17} = -46.9959$ | $d_{17} = 0.1500$ | | |
| $r_{18} = 41.4814$ | $d_{18} = 0.8673$ | $n_{d10} = 1.80518$ | $\nu_{d10} = 25.42$ |
| $r_{19} = 16.2748$ | $d_{19} =$ (Variable) | | |
| $r_{20} = -11.3667$ | $d_{20} = 1.0361$ | $n_{d11} = 1.80518$ | $\nu_{d11} = 25.42$ |
| $r_{21} = -22.5399$ | $d_{21} = 3.3249$ | $n_{d12} = 1.61800$ | $\nu_{d12} = 63.33$ |
| $r_{22} = -13.0258$ | $d_{22} = 0.1500$ | | |
| $r_{23} = 35.7013$ (Aspheric) | $d_{23} = 4.3145$ | $n_{d13} = 1.49700$ | $\nu_{d13} = 81.54$ |
| $r_{24} = -24.9352$ | $d_{24} =$ (Variable) | | |
| $r_{25} = \infty$ | $d_{25} = 17.0000$ | $n_{d14} = 1.51633$ | $\nu_{d14} = 64.14$ |
| $r_{26} = \infty$ | $d_{26} = 1.0000$ | | |
| $r_{27} = \infty$ | $d_{27} = 1.6000$ | $n_{d15} = 1.54771$ | $vd15 = 62.84$ |
| $r_{28} = \infty$ | $d_{28} = 1.0000$ | | |
| $r_{29} = \infty$ | $d_{29} = 0.7500$ | $n_{d16} = 1.52300$ | $\nu_{d16} = 55.00$ |
| $r_{30} = \infty$ | | | |

Zooming Spaces

| | | | |
|---|---|---|---|
| f | 9.160 | 18.421 | 35.299 |
| $d_5$ | 1.1753 | 18.2721 | 29.9465 |
| $d_{12}$ | 31.0299 | 13.9330 | 2.2587 |
| $d_{13}$ | 12.7237 | 7.4591 | 1.4564 |
| $d_{19}$ | 6.8068 | 9.7056 | 11.9414 |
| $d_{24}$ | 4.4949 | 6.8606 | 10.6275 |

-continued

Figure 11:
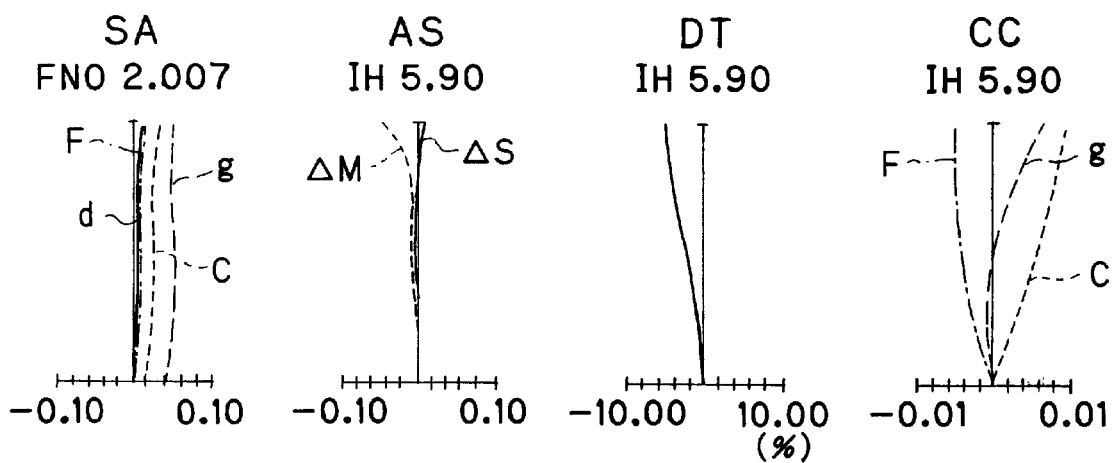
FIGS. 11(a), 11(b) and 11(c) are aberration diagrams of Example 1 upon focused at infinity.
Figure 11:
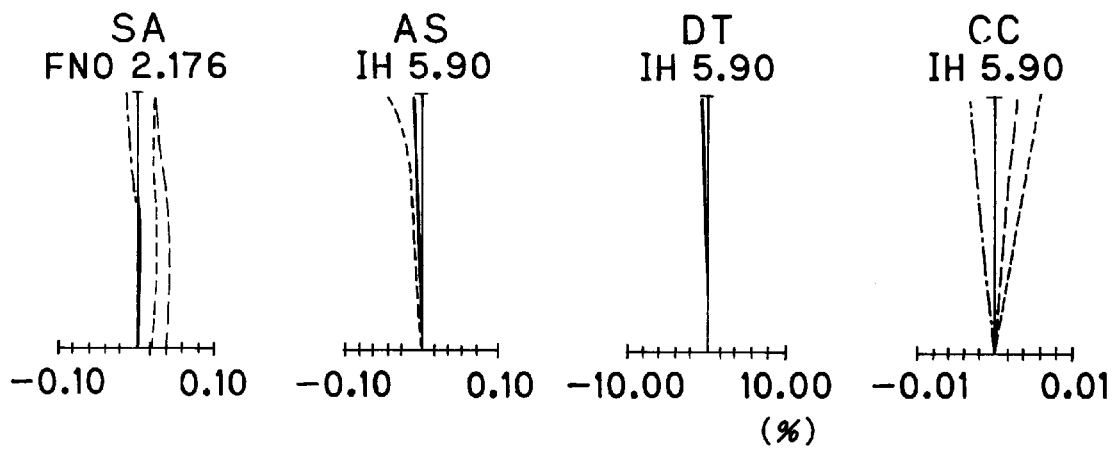
Figure 11:
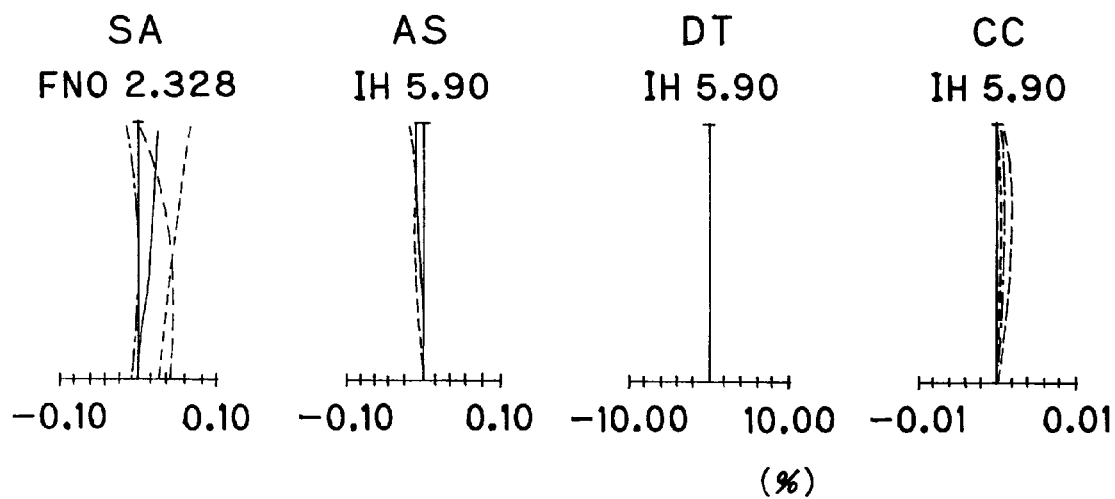
Figure 12:
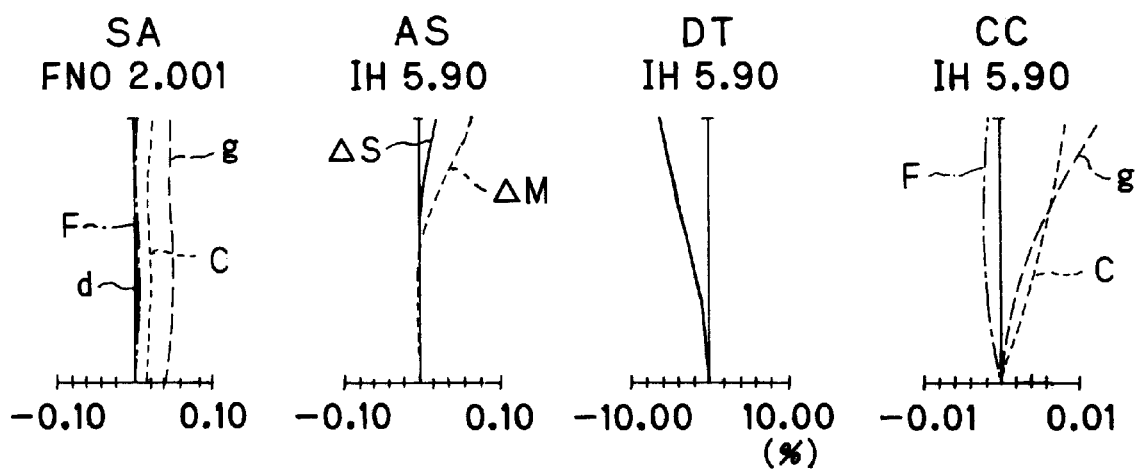
FIGS. 12(a), 12(b) and 12(c) are aberration diagrams of Example 1 upon focused at an object distance of 300 mm.
Figure 12:
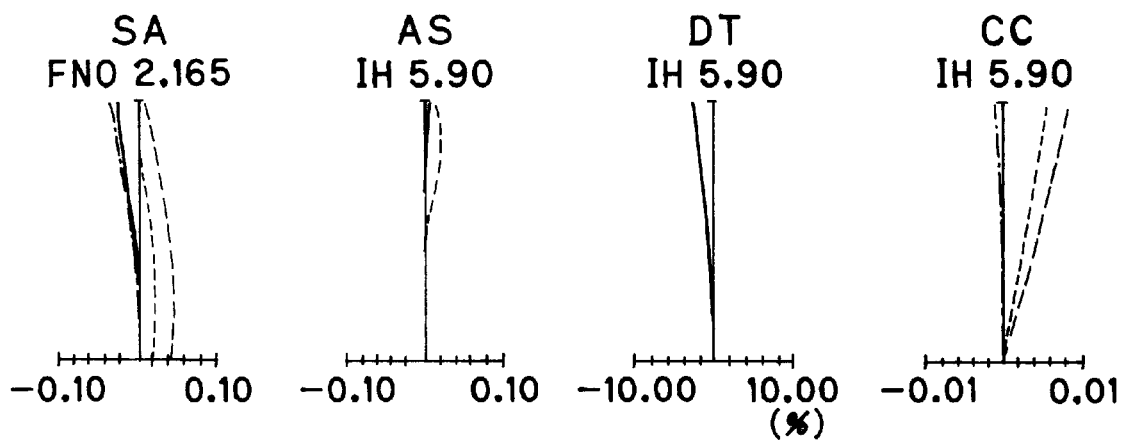
Figure 12:
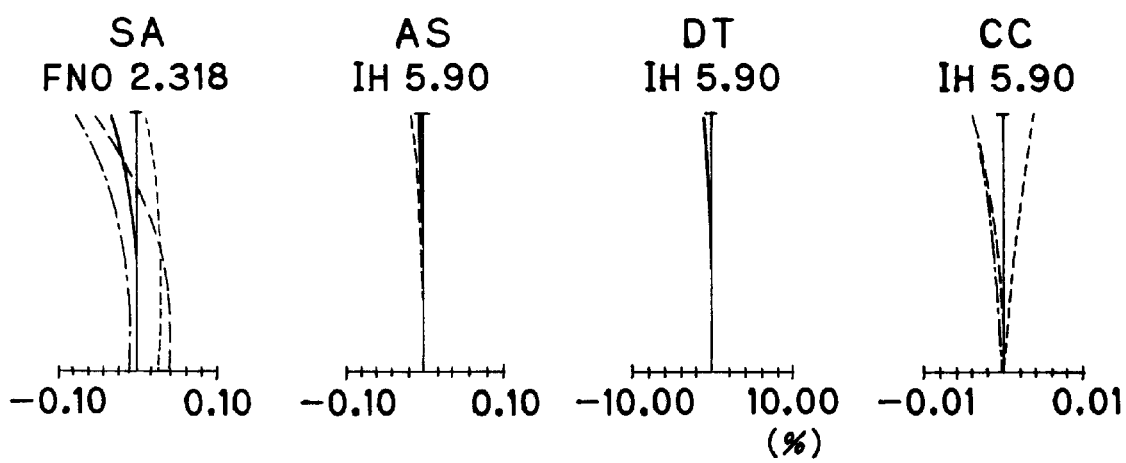

Aspherical Coefficients 16 th surface
K = 0
$A_4 = -3474 \times 10^{-5}$
$A_6 = -1.0384 \times 10^{-8}$
$A_8 = -9.4709 \times 10^{-10}$
$A_{10} = 6.9086 \times 10^{-12}$
23 th surface
K = 0
$A_4 = -2.3280 \times 10^{-5}$
$A_6 = -1.4055 \times 10^{-8}$
$A_8 = 2.9472 \times 10^{-10}$
$A_{10} = -1.4473 \times 10^{-12}$ FIGS. 11(a), 11(b) and 11(c) are aberration diagrams of Example 1 upon focused at infinity. FIGS. 12(a), 12(b) and 12(c) are aberration diagrams of Example 1 upon focused with the fourth lens group 4 at an object distance of 300 mm. In FIGS. 11 and 12, SA, AS, DT and CC stand for spherical aberration, astigmatism, distortion and chromatic aberration of magnification, respectively, at the wide-angle ends (a), intermediate settings (b) and telephoto ends (c). "IH" in these drawings represents an image height.

Set out below are the values of Examples 1 to 10 for conditions (1) to (1).

| Condition | Ex. 1 | Ex. 2 | Ex. 3 | Ex. 4 | Ex. 5 |
|---|---|---|---|---|---|
| (1) | −0.21 | −0.32 | −0.15 | 0.50 | −0.20 |
| (2) | 0.13 | 0.96 | 1.25 | 0.97 | 1.17 |
| (3) | −1.93 | −1.47 | −2.25 | −1.91 | −2.11 |
| (4) | 25.42 | 25.42 | 25.42 | 25.42 | 25.42 |
| (5) | 0.87 | 0.81 | 1.15 | 1.26 | 1.23 |
| (6) | 0.58 | 0.55 | 0.78 | 0.69 | 0.74 |
| (7) | 1.03 | 0.98 | 1.32 | 1.43 | 1.39 |
| (8) | 0.62 | 0.62 | 0.62 | 0.62 | 0.60 |
| (9) | 0.62 | 0.62 | 0.62 | 0.62 | 0.60 |

| Condition | Ex. 6 | Ex. 7 | Ex. 8 | Ex. 9 | Ex. 10 |
|---|---|---|---|---|---|
| (1) | −0.16 | −0.0685 | −0.1462 | −0.21 | −0.18 |
| (2) | 1.07 | 1.4028 | 1.4227 | 1.50 | 1.37 |
| (3) | −2.35 | −2.4406 | −2.4531 | −3.01 | −3.24 |
| (4) | 30.13 | 25.42 | 25.42 | 25.42 | 25.42 |
| (5) | 1.22 | 1.0616 | 1.0681 | 1.06 | 1.23 |
| (6) | 0.91 | 0.7647 | 0.7245 | 0.73 | 0.67 |
| (7) | 1.38 | 1.3525 | 1.2282 | 1.22 | 1.39 |
| (8) | 0.62 | 0.6204 | 0.6204 | 0.62 | 0.62 |
| (9) | 0.62 | 0.6204 | 0.6204 | 0.62 | 0.62 |

Set out below are also the back focuses of Examples 1 to 10 at their wide-angle ends (as calculated on an air basis).
Example 1 22.35
Example 2 22.22
Example 3 22.16
Example 4 22.16
Example 5 22.16
Example 6 22.17
Example 7 21.78
Example 8 22.25
Example 9 21.54
Example 10 20.47

The negative lens that is located in the second lens group G2 and has a partial dispersion ratio satisfying condition (8) is a lens defined by the eighth and ninth surfaces in each of Examples 1 to 5 and Examples 7 to 10 (the second lens in the second lens group G2), and by the eleventh and twelfth surfaces in Example 6 (the fourth lens in the second lens group G2).

The positive lens that is located in the third lens group G3, and the fourth lens group G4 and has a partial dispersion ratio satisfying condition (9) is a lens defined by the fourteenth and fifteenth surfaces in each of Examples 1 to 10 (the first lens in the third lens group G3).

The zoom lens system of the invention may be used on various phototaking devices wherein images are phototaken on image pickup elements such as CCDs or silver-salt films, especially digital or video cameras, personal computers that are one example of information processors, and telephone handsets, especially convenient-to-carry portable telephone sets, etc., as explained below with reference to some specific examples.

Figure 13:
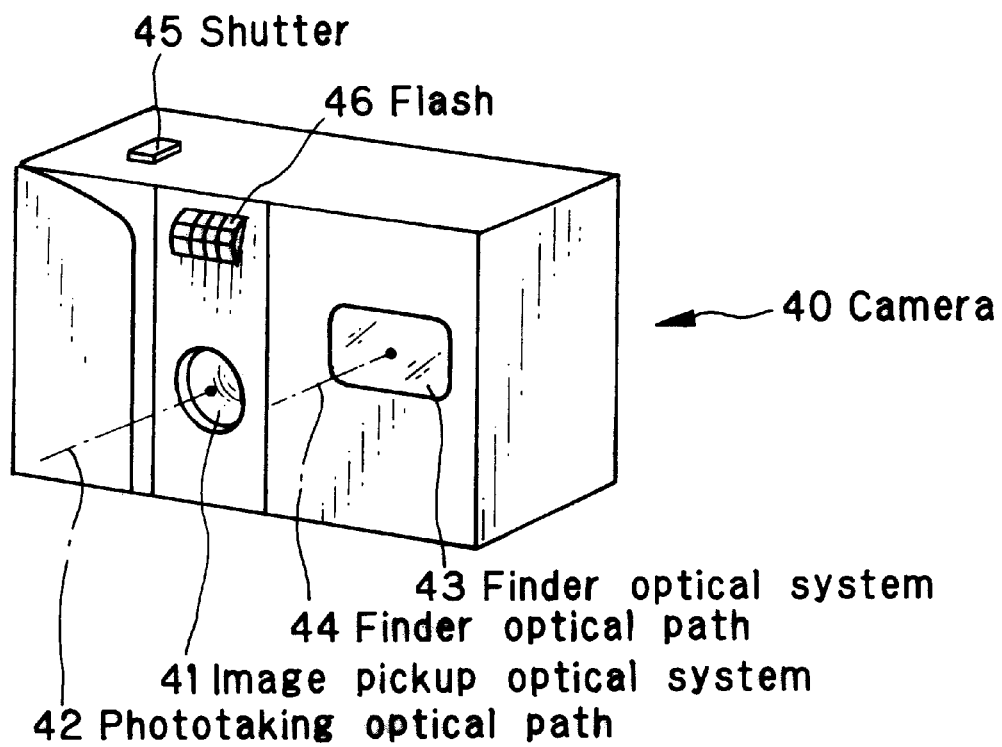
FIG. 13 is a front perspective view showing the appearance of a digital camera in which the zoom lens system of the invention is incorporated. of FIG. 14 is a rear perspective view of the digital camera of FIG. 13.
Figure 14:
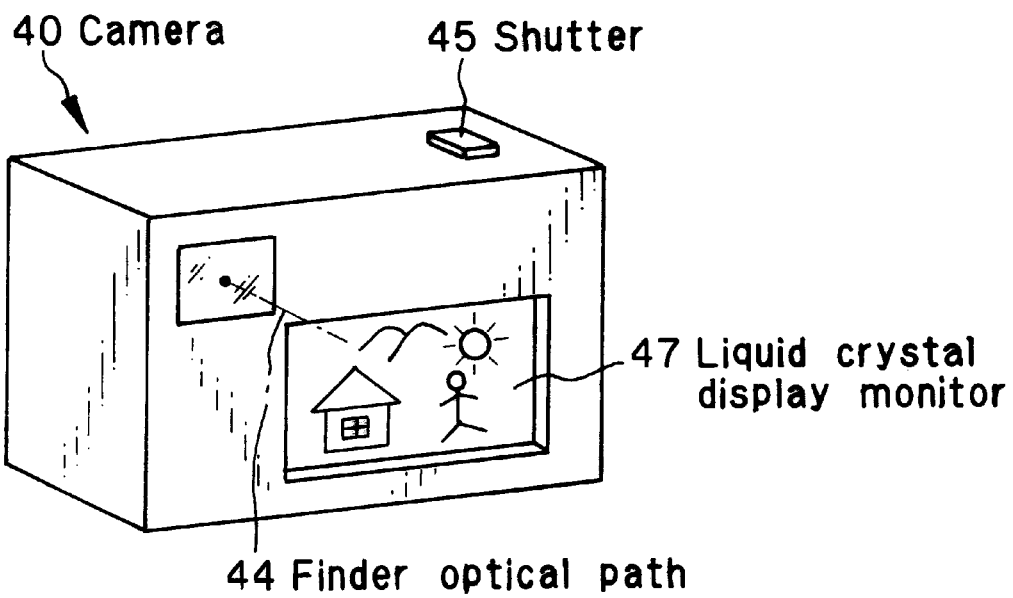
Figure 15:
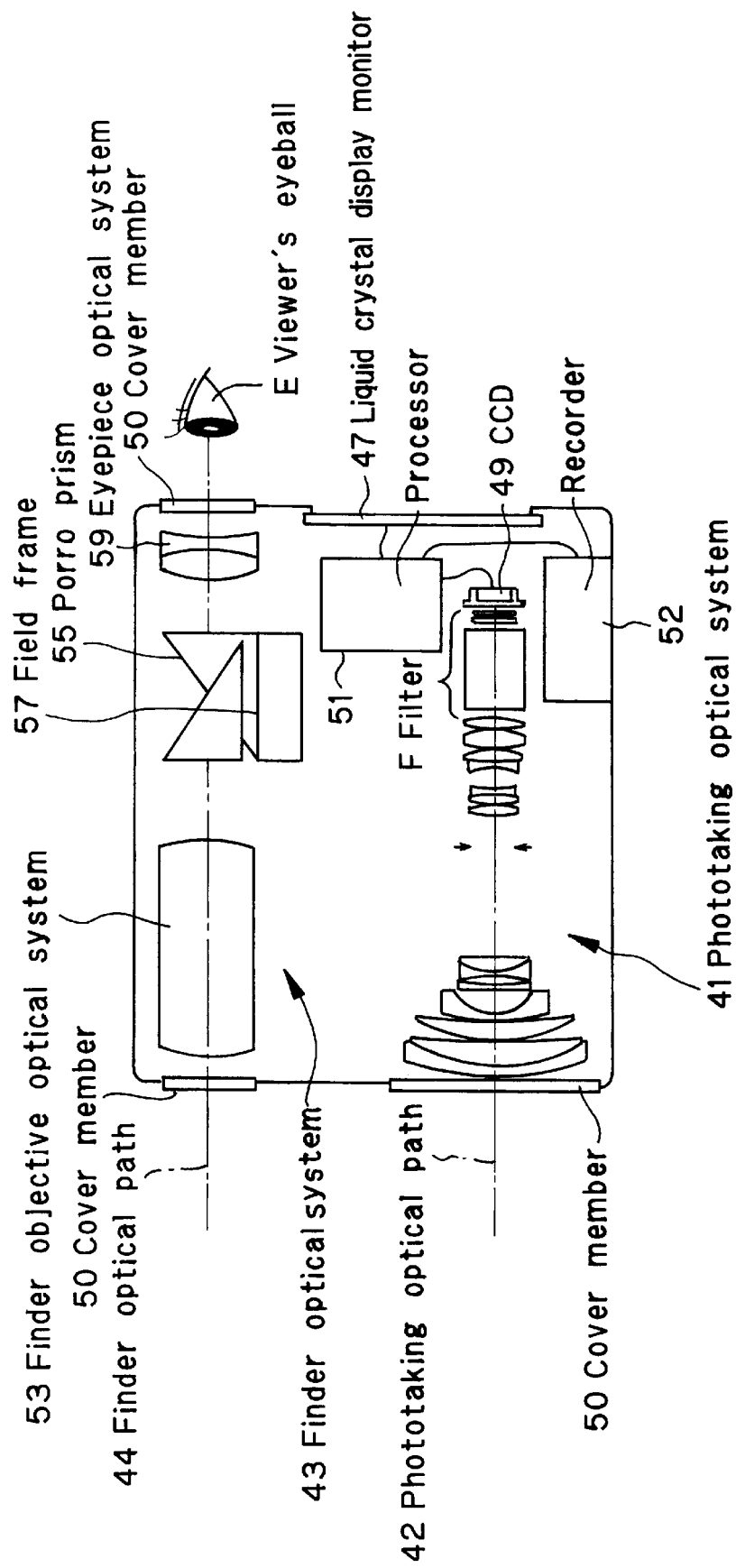
FIG. 15 is a sectional view of the digital camera of FIG. 13.

FIGS. 13 to 15 are conceptual representations of an arrangement wherein the zoom lens system of the invention is incorporated in a phototaking optical system in a digital camera. FIGS. 13 and 14 are a front and a rear perspective view showing the appearance of a digital camera 40, respectively, and FIG. 15 is a sectional view of the construction of the digital camera 40. As depicted, the digital camera 40 comprises a phototaking optical system 41 having a phototaking optical path 42, a finder optical system 43 having a finder optical path 44, a shutter 45, a flash 46 and a liquid crystal display monitor 47. Upon pressing a shutter 45 mounted on the upper portion of the cameral 40, phototaking occurs through the phototaking optical system 41, e.g., the zoom lens system according to Example 1. An object image formed through the phototaking optical system 41 is formed on an image pickup surface of a CCD 49 via filters F such as a low-pass filter and an infrared cut filter. An object image received at CCD 49 is displayed as an electronic image on the liquid crystal display monitor 47 via a processing means 51, said monitor 47 being mounted on the back side of the camera. The processing means 51 may be connected with a recording means 52 for recording the phototaken electronic image. It is here noted that the recording means 52 may be located separately from the processing means 51. For this recording means 52, it is acceptable to use a floppy disk or memory card or an MO that can write or read information electronically. Alternatively, a silver-salt film may be used in place of CCD 49 to set up a silver-salt camera.

In addition, a finder objective optical system 53 is mounted on the finder optical path 44. An object image formed through the finder objective optical system 53 is formed on a field frame 57 of a Porro prism 55 that is an image-erecting member. In the rear of this Porro prism 55, there is located an eyepiece optical system 59 for guiding the erected image to a viewer's eyeball E. Two cover members 50 are provided, one on the entrance side of the phototaking optical system 41 and finder objective optical system 53 and another on the exit side of an eyepiece optical system 59.

In the digital camera 40 set up in this way, the phototaking optical system 41 is constructed of the zoom lens system of the invention which has high zoom ratios at the wide-angle end with well-corrected aberrations, is fast, and has a back focus large-enough for accommodation of filters, etc. Thus, high performance and cost reductions are achievable.

Figure 16:
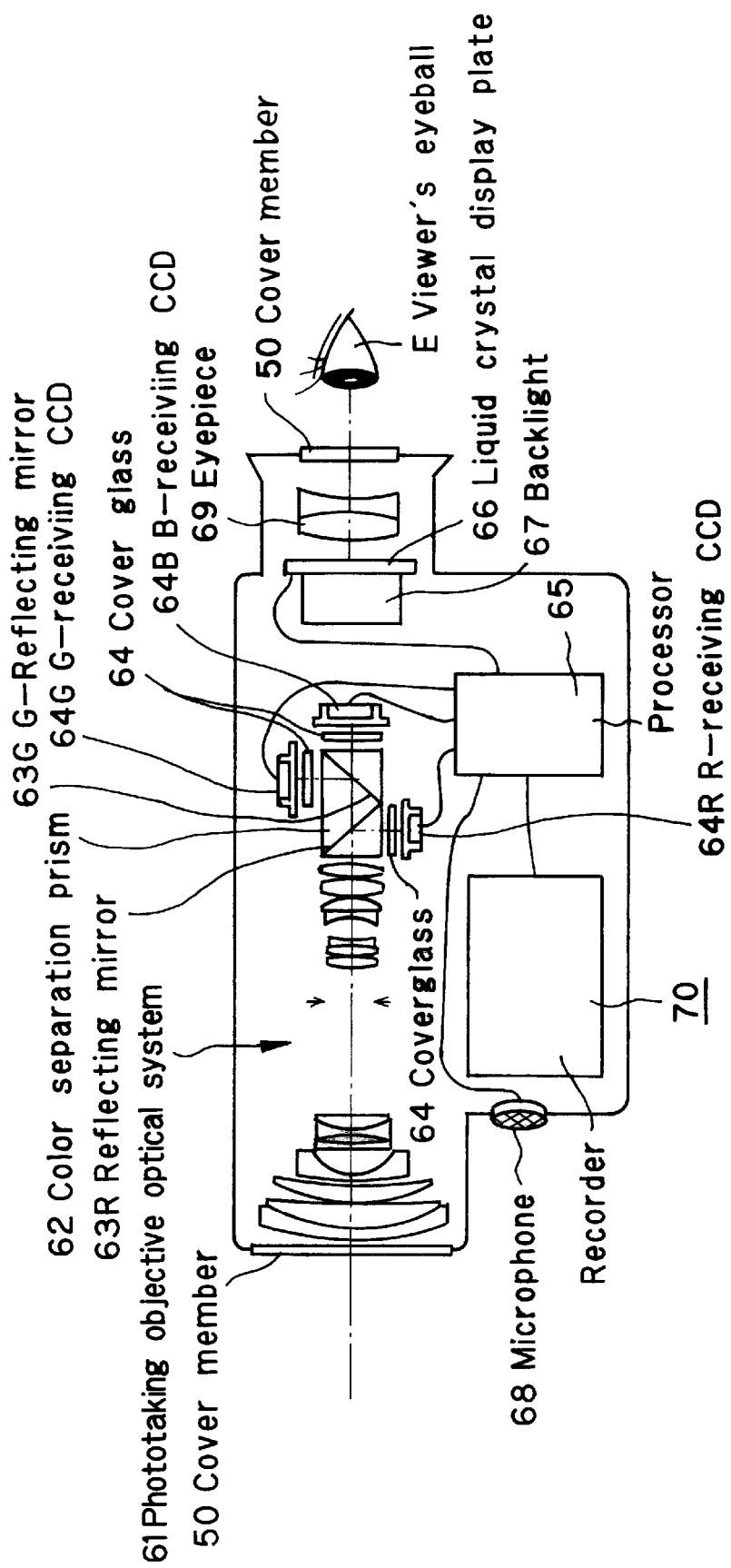
FIG. 16 is a conceptual view showing one construction of a video camera in which the zoom lens system of the invention is incorporated.

FIG. 16 is a conceptual representation of an arrangement wherein the zoom lens system of the invention is incorporated in an objective optical system in the phototaking portion of a video camera. The zoom lens system according to Example 1 is used for a phototaking objective optical system 61 located on a phototaking optical path. Upon passing through the phototaking objective optical system 61, an image-forming light beam is separated into beams R, G and B through an R-reflecting mirror 63R and a G-reflecting mirror 63G in a color separation prism 62 located on a back focus side, so that object images separated into R, G and B are formed on an R-receiving CCD 64R, a G-receiving CCD 64G and a B-receiving CCD 64B, each provided with a cover glass 64. The color-separated object images received at CCDs 64R, 64G and 64B are displayed as a color electronic image on a liquid crystal display plate 66 through a processing means 65. This processing means 65 also controls a recording means 70 (e.g., a video tape, a CD or a DVD) for recording a sound from a microphone 68 and object images phototaken through CCDs 64R, 64G and 64B as electronic information. The image displayed on the liquid crystal display plate 66 is illuminated by a backlight and then guided via an eyepiece optical system 69 to a viewer's eyeball E. Two cover members 50 are provided, one on the entrance side of the phototaking objective optical system 61 and another on the exit side of the eyepiece optical system 69.

In this video camera, too, the phototaking objective optical system 61 is constructed of the zoom lens system of the invention which has high zoom ratios at the wide-angle end with well-corrected aberrations, is fast, and has a back focus large-enough for accommodation of filters, etc. Thus, high performance and cost reductions are achievable. In addition, the large back focus ensures a high degree of freedom in locating the color separation prism 62 on the back focus side.

In the embodiments of FIGS. 15 and 16, plane-parallel plates are used for the covering members 50. However, it is acceptable to use lenses having powers.

FIG. 17(a) is a conceptual representation of an arrangement wherein the zoom lens system of the invention is incorporated in an objective optical system in a single-lens reflex camera. In this embodiment, too, the zoom lens system according to Example 1 is used as an objective optical system 71. Upon passing through the objective optical system 71, an image-forming beam is separated by a half-silvered mirror (e.g., a beam splitter) 72 located on the back focus side into two light beams, one for a phototaking optical path and another for a finder optical path. It is here preferable to use a quick-return mirror in place of the half-silvered prism 71 because any quantity-of-light loss can be avoided. In the phototaking optical path, there are located filters F such as a low-pass filter and an infrared cut filter and a CCD 73, so that an object image can be formed on an image pickup surface of CCD 73 through the filters F. In the finder optical path, a screen mat 74 is located on a primary image plane formed at a position conjugate with the image pickup surface. This primary image is reflected at a plane mirror 75 and then relayed as a secondary image through a relay optical system 76 while it is erected. Then, the secondary image is guided through an eyepiece 77 to a viewer's eyeball E.

In the finder optical path portion of FIG. 17(a), the plane mirror 75 and relay optical system 76 may be replaced by a concave mirror prism 78 having positive power, as illustrated in FIG. 17(b). By use of such an arrangement, it is possible to reduce the number of parts and achieve compactness as well. In the case of the concave mirror prism 78, it is acceptable to impart powers to the entrance and exit surfaces. It is also acceptable to construct the reflecting surface of not only a rotationally symmetric surface (e.g., a spherical or aspherical surface) but also a rotationally asymmetric surface such as an anamorphic or free-form surface. It is further acceptable to use a silver-salt film in place of CCD 73, thereby sitting up a silver-salt camera.

Figure 18:
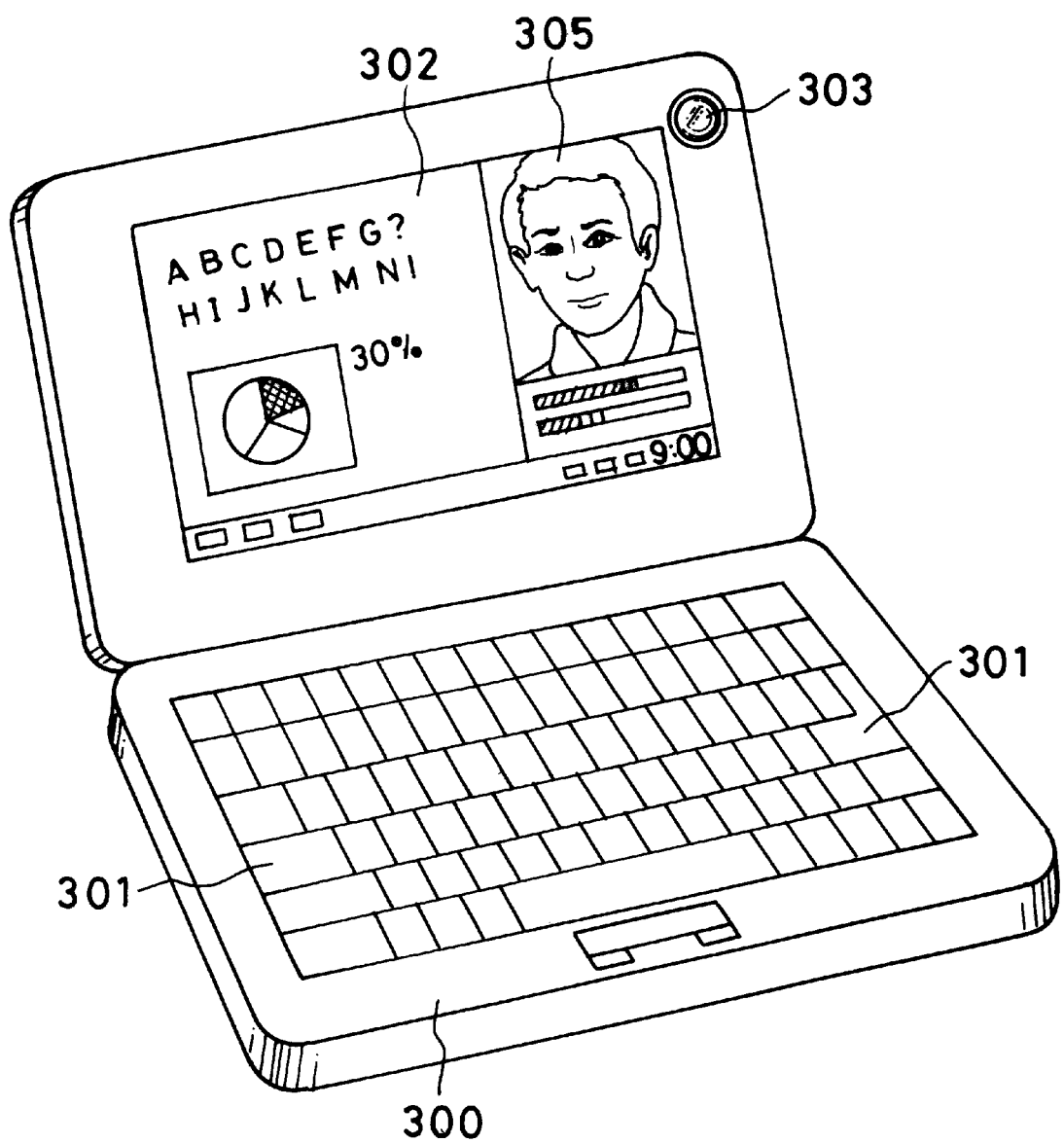
FIG. 18 is a front perspective view illustrative of an uncovered personal computer in which the zoom lens system of the invention is incorporated in the form of an objective optical system.
Figure 19:
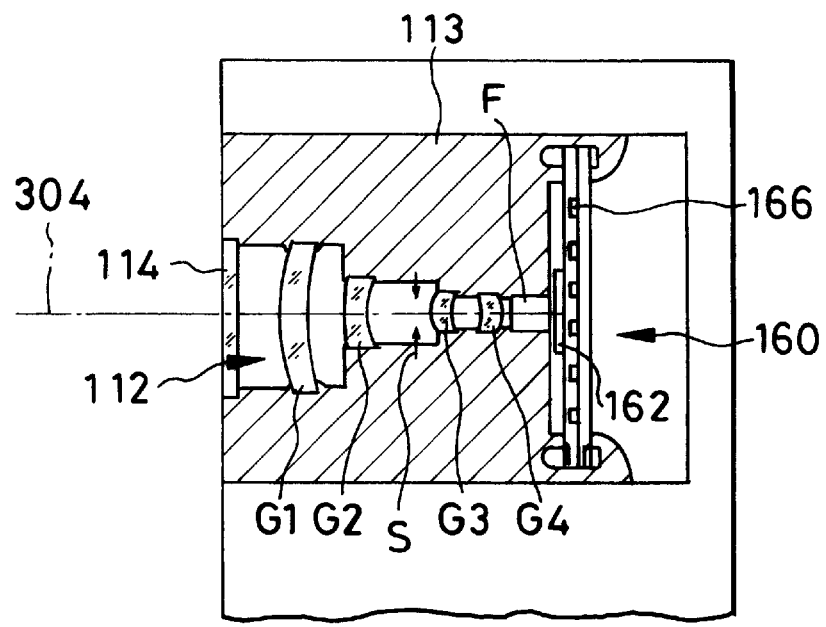
FIG. 19 is a sectional view illustrative of a phototaking optical system in a personal computer.
Figure 20:
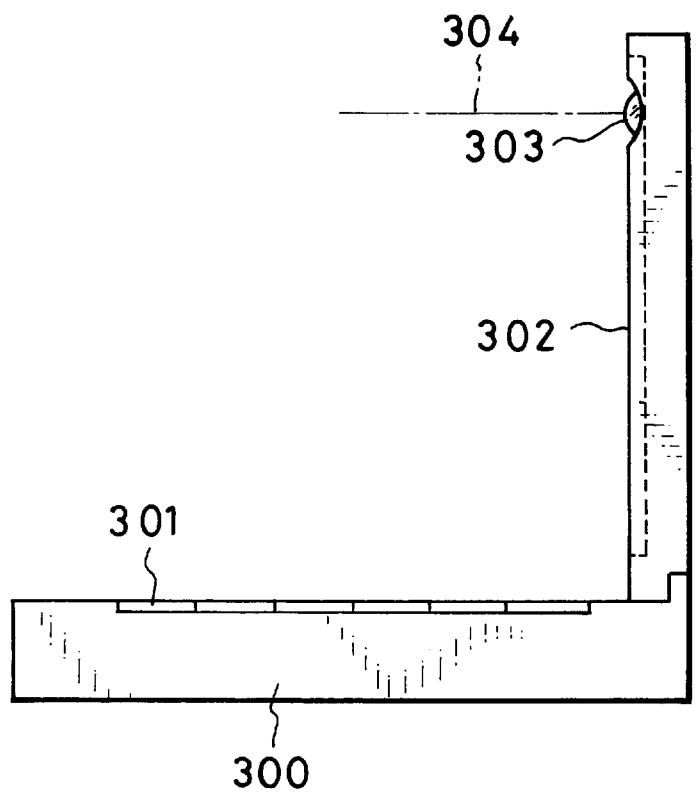
FIG. 20 is a side view of FIG. 18.

Shown in FIGS. 18 to 20 is a personal computer that is one example of the information processor in which the zoom lens system of the invention is incorporated in the form of an objective optical system. FIG. 18 is a front perspective view of an uncovered personal computer 300, FIG. 19 is a sectional view of a phototaking optical system 303 mounted on the personal computer 300, and FIG. 20 is a side view of FIG. 18. As depicted in FIGS. 18 to 20, the personal computer 300 comprises a keyboard 301 for allowing an operator to enter information therein from outside, information processing and recording means (not shown), a monitor 302 for displaying the information to the operator and a phototaking optical system 303 for phototaking an image of the operator per se and images of operator's surroundings. The monitor 302 used herein may be a transmission type liquid crystal display device designed to be illuminated by a backlight (not shown) from the back side, a reflection type liquid crystal display device designed to display images by reflecting light from the front side, a CRT display or the like. As shown, the phototaking optical system 303 is built in a right upper portion of monitor 302. However, it is to be understood that the phototaking optical system 303 may be positioned somewhere on the periphery of monitor 302 or keyboard 301.

The phototaking optical system 303 includes on a phototaking optical path 304 an objective lens system 112 comprising the zoom lens system of the invention (roughly illustrated) and an image pickup element chip 162 for receiving an image. These are built in the personal computer 300.

It is here to be understood that an IR cut filter out of members F such as an optical filter is additionally pasted onto the image pickup element chip 162 to construct an integral image pickup unit 160. This image pickup unit 160 can be fitted in the rear end of a lens barrel 113 of the objective lens system 112 in one-touch simple operation, so that centering and alignment of the objective lens system 112 with respect to the image pickup element chip 162 can be dispensed with to make assembly simple. At the end of the lens barrel 23, there is provided a cover glass 114 for protection of the objective lens system 112. It is here to be understood that the zoom lens driving mechanism in the lens barrel 113 is not shown.

An object image received at the image pickup element chip 162 is entered from a terminal 166 in the processing means in the personal computer 300, and displayed as an electronic image on the monitor 302. Shown in FIG. 18 as an example is a phototaken image 305 of the operator. It is possible to display the image 305, etc. on a personal computer at the other end on a remote place via an internet or telephone line.

Figure 21:
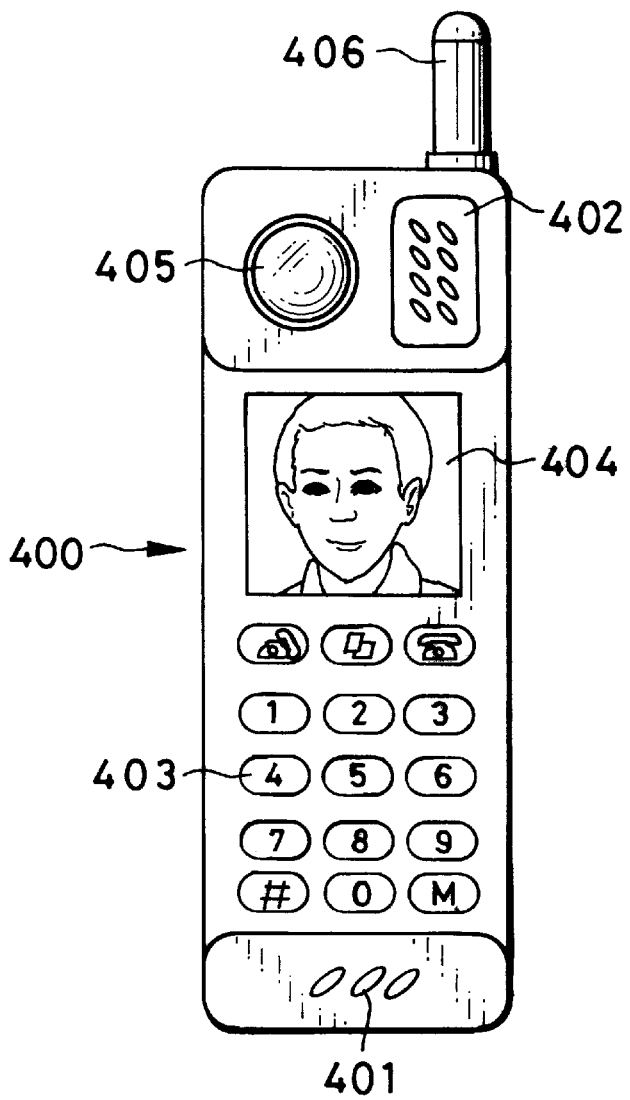
Figure 21:
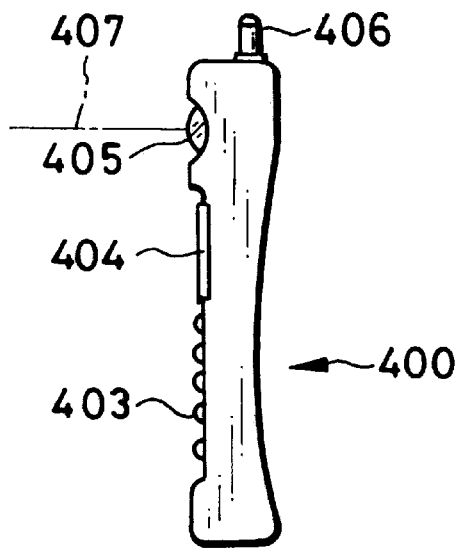
Figure 21:
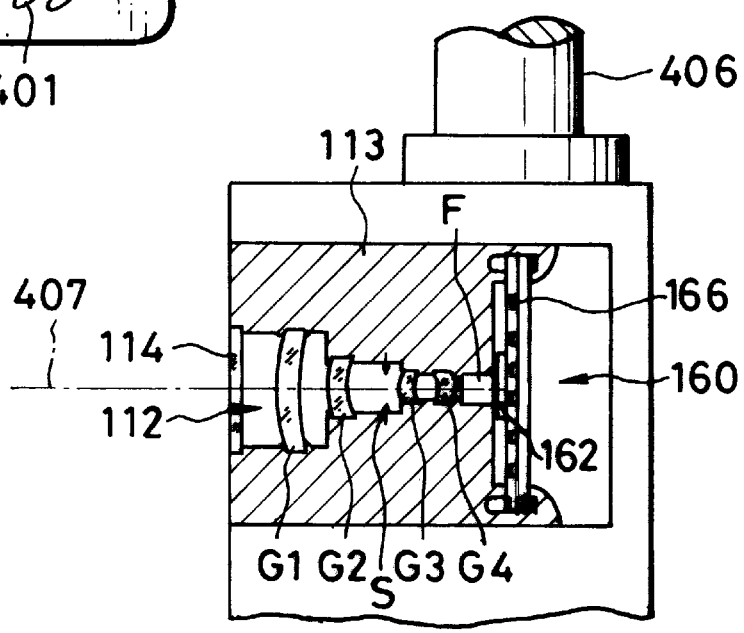

Illustrated in FIG. 21 is a telephone handset that is one example of the information processor in which the zoom lens system of the invention is built in the form of a phototaking optical system, especially a convenient-to-carry portable telephone handset. FIG. 21(*a*) is a front view of a portable telephone handset 400, FIG. 21(*b*) is a side view of handset 400 and FIG. 21(*c*) is a sectional view of a phototaking optical system 405. As depicted in FIGS. 21(*a*) to 21(*c*), the telephone handset 400 comprises a microphone portion 401 for entering an operator's voice therein as information, a speaker portion 402 for producing a voice of a person on the other end, an input dial 403 allowing the operator to enter information therein, a monitor 404 for displaying phototaken images of the operator and the person on the other end and information such as telephone numbers, a phototaking optical system 405, an antenna 406 for transmitting and receiving communication waves and a processing means (not shown) for processing image information, communication information, input signals, etc. The monitor 404 used herein is a liquid crystal display device. The arrangement of these parts is not necessarily limited to that illustrated. The phototaking optical system 405 includes on a phototaking optical path 407 an objective lens system 112 comprising the zoom lens system (roughly illustrated) of the invention and an image pickup element chip 162 for receiving an object image. These are built in the telephone handset 400.

It is here to be understood that an IR cut filter out of members F such as an optical filter is additionally pasted onto the image pickup element chip 162 to construct an integral image pickup unit 160. This image pickup unit 160 can be fitted in the rear end of a lens barrel 113 of the objective lens system 112 in one-touch simple operation, so that centering and alignment of the objective lens system 112 with respect to the image pickup element chip 162 can be dispensed with to make assembly simple. At the end of the lens barrel 113, there is provided a cover glass 114 for protection of the objective lens system 112. It is here to be understood that the zoom lens driving mechanism in the lens barrel 113 is not shown.

The object image received at the image pickup element chip 162 is entered from a terminal 166 in a processing means (not shown), and displayed as an electronic image on the monitor 404 and/or a monitor on the other end. To transmit an image to a person on the other end, the processing means includes a signal processing function of converting information about the object image received at the image pickup element chip 162 to transmittable signals.

According to the present invention as explained above, it is possible to provide a zoom lens system which has wide field angles and high zoom ratios with well-corrected aberrations, is fast, and has a large back focus.

What we claim is:

1. A zoom lens system which comprises, in order from an object side of said zoom lens system, a first lens group having positive refracting power, a second lens group having negative refracting power, a third lens group having positive refracting power and a fourth lens group having positive refracting power and in which for zooming from a wide-angle end to a telephoto end of said zoom lens system, said second lens group moves toward an image side of said zoom lens system, said third lens group moves toward said object side and said fourth lens group moves toward said object side, wherein:

a lens located nearest to said image side in said third lens group is a negative lens concave with respect to an image plane of said zoom lens system and a lens located nearest to said object side in said fourth lens group is a negative lens concave with respect to an object.

2. A zoom lens system which comprises, in order from an object side of said zoom lens system, a first lens group having positive refracting power, a second lens group having negative refracting power, a third lens group having positive refracting power and a fourth lens group having positive refracting power and in which for zooming from a wide-angle end to a telephoto end of said zoom lens system, said first lens group remains fixed on an optical axis of said zoom lens system, said second lens group moves toward an image side of said zoom lens system, a stop remains fixed on said optical axis, said third lens group moves toward said object side and said fourth lens group moves toward said object side, wherein:

a lens located nearest to said image side in said third lens group is a negative lens concave with respect to an image plane of said zoom lens system and a lens located nearest to said object side in said fourth lens group is a negative lens concave with respect to an object.

3. The zoom lens system according to claim 1 or 2, wherein said fourth lens group comprises, in order from said object side, a negative lens, a positive lens and a positive lens.

4. The zoom lens system according to claim 3, wherein said fourth lens group consists of, in order from said object side, a negative lens, a positive lens and a positive lens.

5. The zoom lens system according to claim 1 or 2, wherein said second lens group comprises, in order from said object side, a negative lens, a negative lens, a negative lens and a positive lens or a negative lens, a negative lens, a positive lens and a negative lens.

6. The zoom lens system according to claim 1 or 2, wherein said fourth lens group consists of, in order from said object side, a negative lens, a positive lens, a positive lens and a positive lens.

7. The zoom lens system according to claim 1 or 2, wherein any one negative lens in said second lens group satisfies the following condition:

$$0.59 < (n_g - n_F)/(n_F - n_C) \qquad (8)$$

where:

$n_j$ (j is g, F, and C) is a j-line refractive index of said negative lens.

8. The zoom lens system according to claim 1 or 2, wherein any one positive lens in said third lens group or said fourth lens group satisfies the following condition:

$$0.59 < (n_g - n_F)/(n_F - n_C) \qquad (8)$$

where:

$n_j$ (j is g, F, and C) is a j-line refractive index of said positive lens.

9. The zoom lens system according to claim 1 or 2, wherein any one positive lens in said third lens group satisfies the following condition:

$$0.59 < (n_g - n_F)/(n_F - n_C) \qquad (8)$$

where:

$n_j$ (j is g, F, and C) is a j-line refractive index of said positive lens.

10. The zoom lens system according to claim 1 or 2, wherein focusing is carried out by said fourth lens group.

11. The zoom lens system according to claim 1 or 2, wherein an aspherical surface is used in said third lens group and an aspherical surface is used in said fourth lens group.

12. The zoom lens system according to claim 1 or 2, wherein an optical path splitter for an optical finder is located between said fourth lens group and said image side.

13. The zoom lens system according to claim 1 or 2, wherein said fourth lens group has therein at least one aspherical surface configured such that positive refracting power thereof decreases farther off an optical axis of said zoom lens system or negative refracting power thereof increases farther off said optical axis.

14. An image pickup device comprising a zoom lens system as recited in claim 1 or 2, an image pickup element for receiving an object image formed by said zoom lens system, and a display unit for displaying said object image.

15. The zoom lens system according to claim 1 or 2, which satisfies the following condition (1):

$$-0.9<(r_{4F}+r_{3R})/(r_{4F}-r_{3R})<0.9 \quad (1)$$

where:

$r_{3R}$ is a radius of curvature of an image-side surface of said negative lens located nearest to said image side in said third lens group, and $r_{4F}$ is a radius of curvature of an object-side surface of said negative lens located nearest to said object side in said fourth lens group.

16. The zoom lens system according to claim 1 or 2, which satisfies the following condition (2):

$$0.5<(1/r_{3R}-1/r_{4F})*f_w<2.5 \quad (2)$$

where:

$r_{3R}$ is a radius of curvature of an image-side surface of said negative lens located nearest to said image side in said third lens group, and $r_{4F}$ is a radius of curvature of an object-side surface of said negative lens located nearest to said object side in said fourth lens group, and $f_w$ is a focal length of said zoom lens system at a wide-angle end of said zoom lens system.

17. The zoom lens system according to claim 1 or 2, which satisfies the following condition (3):

$$-3.7<f_{4F}/f_w<-1 \quad (3)$$

where:

$f_w$ is a focal length of said zoom lens system at a wide-angle end of said zoom lens system, and $f_{4F}$ is a focal length of said negative lens located nearest to said object side in said fourth lens group.

18. The zoom lens system according to claim 1 or 2, which satisfies the following condition (4):

$$v_{d4F}<40 \quad (4)$$

where:

$v_{d4F}$ is an Abbe's number of said negative lens located nearest to said object in said fourth lens group.

19. The zoom lens system according to claim 1 or 2, which satisfies the following condition (5):

$$0.6<z_3/f_w<3 \quad (5)$$

where:

$z_3$ is an amount of movement of a third lens group from said wide-angle end to said telephoto end with the plus sign indicating the movement of said third lens group from said image side to said object side, and $f_w$ is a focal length of said zoom lens system at a wide-angle end of said zoom lens system.

20. The zoom lens system according to claim 1 or 2, which satisfies the following condition (6):

$$0.3<z_4/f_w<2.5 \quad (6)$$

where:

$z_4$ is an amount of movement of a fourth lens group from said wide-angle end to said telephoto end with the plus sign indicating the movement of said fourth lens group from said image side to said object side, and $f_w$ is a focal length of said zoom lens system at a wide-angle end of said zoom lens system.

21. A zoom lens system according to claim 2, which satisfies the following condition (7)

$$0.6<D_{s3w}<3 \quad (7)$$

where:

$D_{s3w}$ is a separation between said stop and said third lens group at said wide-angle end.

22. A zoom lens system comprising, in order from an object side of said zoom lens system:

a first lens group having positive refracting power;

a second lens group having negative refracting power;

a third lens group having positive refracting power; and a fourth lens group having positive refracting power, wherein an air separation between adjacent lens groups is varied, an air separation between said third lens group and said fourth lens group is larger at a telephoto end than at a wide-angle end, and any one negative lens in said second lens group satisfies the following condition (8)

$$0.59<(n_g-n_F)/(n_F-n_C) \quad (8)$$

where:

$n_j$ is g, F and C) is a j-line refractive index of said negative lens.

23. A zoom lens system comprising, in order from an object side of said zoom lens system:

a first lens group having positive refracting power;

a second lens group having negative refracting power;

a third lens group having positive refracting power; and a fourth lens group having positive refracting power, wherein a lens located nearest to an object side of said fourth lens group is concave on said object side, and any one negative lens in said second lens group satisfies the following condition (8)

$$0.59<(n_g-n_F)/(n_F-n_C) \quad (8)$$

where:

$n_j$ (j is g, F and C) is a j-line refractive index of said negative lens.

* * * * *